(12) United States Patent
Shoda

(10) Patent No.: US 8,083,404 B2
(45) Date of Patent: Dec. 27, 2011

(54) SEMICONDUCTOR INTEGRATED CIRCUIT

(75) Inventor: Tomoaki Shoda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 786 days.

(21) Appl. No.: 12/199,195

(22) Filed: Aug. 27, 2008

(65) Prior Publication Data

US 2009/0059999 A1 Mar. 5, 2009

(30) Foreign Application Priority Data

Aug. 31, 2007 (JP) ................... P2007-227001

(51) Int. Cl.
*G01K 7/16* (2006.01)
(52) U.S. Cl. ........................ 374/170; 374/185
(58) Field of Classification Search ................. 374/170, 374/173, 176, 178
See application file for complete search history.

(56) References Cited

U.S. PATENT DOCUMENTS

| | | | |
|---|---|---|---|
| 6,255,891 B1 * | 7/2001 | Matsuno et al. | 374/E7.035 |
| 6,882,213 B2 * | 4/2005 | Kim | 374/E3.002 |
| 7,078,954 B2 * | 7/2006 | Watanabe | 374/E7.027 |
| 7,414,455 B2 * | 8/2008 | Nam et al. | 374/E3.002 |
| 7,459,983 B2 * | 12/2008 | Gyoten et al. | 374/E7.035 |
| 7,607,827 B2 * | 10/2009 | Karikomi et al. | 374/141 |
| 7,731,417 B2 * | 6/2010 | Kumagai | 374/1 |
| 7,969,227 B2 * | 6/2011 | Hasegawa et al. | 374/163 |
| 7,988,354 B2 * | 8/2011 | Jansen | 374/170 |
| 2007/0110123 A1 * | 5/2007 | Nam et al. | 374/170 |
| 2008/0162067 A1 * | 7/2008 | Inukai et al. | 702/99 |
| 2008/0187026 A1 * | 8/2008 | Ueda | 374/185 |
| 2008/0198899 A1 * | 8/2008 | Igarashi | 374/163 |
| 2008/0252360 A1 * | 10/2008 | Yoshikawa | 327/512 |
| 2009/0010301 A1 * | 1/2009 | Nagahisa | 374/1 |
| 2009/0059999 A1 * | 3/2009 | Shoda | 374/185 |
| 2011/0019713 A1 * | 1/2011 | Sinha et al. | 374/1 |
| 2011/0096809 A1 * | 4/2011 | Campos et al. | 374/178 |
| 2011/0158285 A1 * | 6/2011 | Igarashi | 374/163 |

FOREIGN PATENT DOCUMENTS

| | | |
|---|---|---|
| JP | 10-011157 | 1/1998 |
| JP | 10-260082 | 9/1998 |
| JP | 2007-225477 | 9/2007 |

* cited by examiner

*Primary Examiner* — Yaritza Guadalupe-McCall
(74) *Attorney, Agent, or Firm* — Turocy & Watson, LLP

(57) ABSTRACT

A temperature detection circuit includes: a voltage generator that is connected to a first voltage line having first voltage and a second voltage line having second voltage and to output a third voltage to a third voltage line, the third voltage being obtained by transforming the first voltage to be stepped down as an ambient temperature becomes higher; and a detecting unit that includes: a delay section that is connected to the second voltage line and the third voltage line and to receive a pulse signal, the delay section being configured to output a delayed pulse signal that is obtained by delaying the pulse signal for a delay time set to be longer as the third voltage becomes lower; and a temperature detecting section that is configured to: receive the delayed pulse signal and the pulse signal; latch the delayed pulse signal based on the pulse signal; output the latched signal as a detection result.

19 Claims, 11 Drawing Sheets

$VddT1 \fallingdotseq Vdd \times \{Roff1a/(Roff2+Roff1a)\} = Vdd \times \{Roff1/(Roff2+Roff1)\}$ $VddT2 \fallingdotseq Vdd \times \{Roff1b/(Roff3+Roff1b)\} = Vdd \times \{Roff1/(Roff3+Roff1)\}$ $VddT3 \fallingdotseq Vdd \times \{Roff1c/(Roff4+Roff1c)\} = Vdd \times \{Roff1/(Roff4+Roff1)\}$ $VddT1 \fallingdotseq Vdd \times \{Ron1a/(Ron2+Ron1a)\} = Vdd \times \{Ron1/(Ron2+Ron1)\}$
$VddT2 \fallingdotseq Vdd \times \{Ron1b/(Ron3+Ron1b)\} = Vdd \times \{Ron1/(Ron3+Ron1)\}$
$VddT3 \fallingdotseq Vdd \times \{Ron1c/(Ron4+Ron1c)\} = Vdd \times \{Ron1/(Ron4+Ron1)\}$

US 8,083,404 B2

SEMICONDUCTOR INTEGRATED CIRCUIT

CROSS-REFERENCE TO RELATED APPLICATIONS

This application claims priority from Japanese Patent Application 2007-227001, filed Aug. 31, 2007, the entire contents of which are incorporated herein by reference.

BACKGROUND OF THE INVENTION

1. Technical Field

The present invention relates to temperature detection.

2. Description of the Related Art

With the advance of micropatterning, increase in the operating speed, and high-integration of a semiconductor element, an amount of self-heating of a semiconductor integrated circuit (large scale integration (LSI) circuit) increases. Also, the chip temperature of a semiconductor integrated circuit (LSI circuit) rises. The rise of the chip temperature causes the need for controlling electrical characteristics, such as a reference clock frequency to be used for a circuit operation and impedance of an output driver, according to a change in the temperature. A temperature sensor or the like provided outside a semiconductor integrated circuit (LSI circuit), which has a thermal diode or a thermistor, is used as a monitor for monitoring a temperature (see, for example, JP-A-10-260082).

In the temperature sensor described in JP-A-10-260082, the temperature sensor can measure a temperature with high precision, the cost thereof increases, and that the mounting area of the temperature sensor is increased. Additionally, because the temperature sensor is provided outside the semiconductor integrated circuit (LSI circuit), the number of measurement points cannot be increased.

SUMMARY OF THE INVENTION

According to an aspect of the present invention, there is provided a temperature detection circuit including: a voltage generator that is configured to be connected to a first voltage line having first voltage and a second voltage line having second voltage that is lower than the first voltage and to output a third voltage to a third voltage line, the third voltage being obtained by transforming the first voltage to be stepped down as an ambient temperature becomes higher; and a detecting unit that includes: a delay section that is configured to be connected to the second voltage line and the third voltage line and to receive a pulse signal, the delay section being configured to output a delayed pulse signal that is obtained by delaying the pulse signal for a delay time set to be longer as the third voltage becomes lower; and a temperature detecting section that is configured to: receive the delayed pulse signal and the pulse signal; latch the delayed pulse signal based on the pulse signal; output the latched signal as a detection result indicating change of the ambient temperature.

DETAILED DESCRIPTION OF EXEMPLARY EMBODIMENTS

Hereinafter, embodiments of the invention are described with reference to the accompanying drawings.

Embodiment 1

Figure 1:
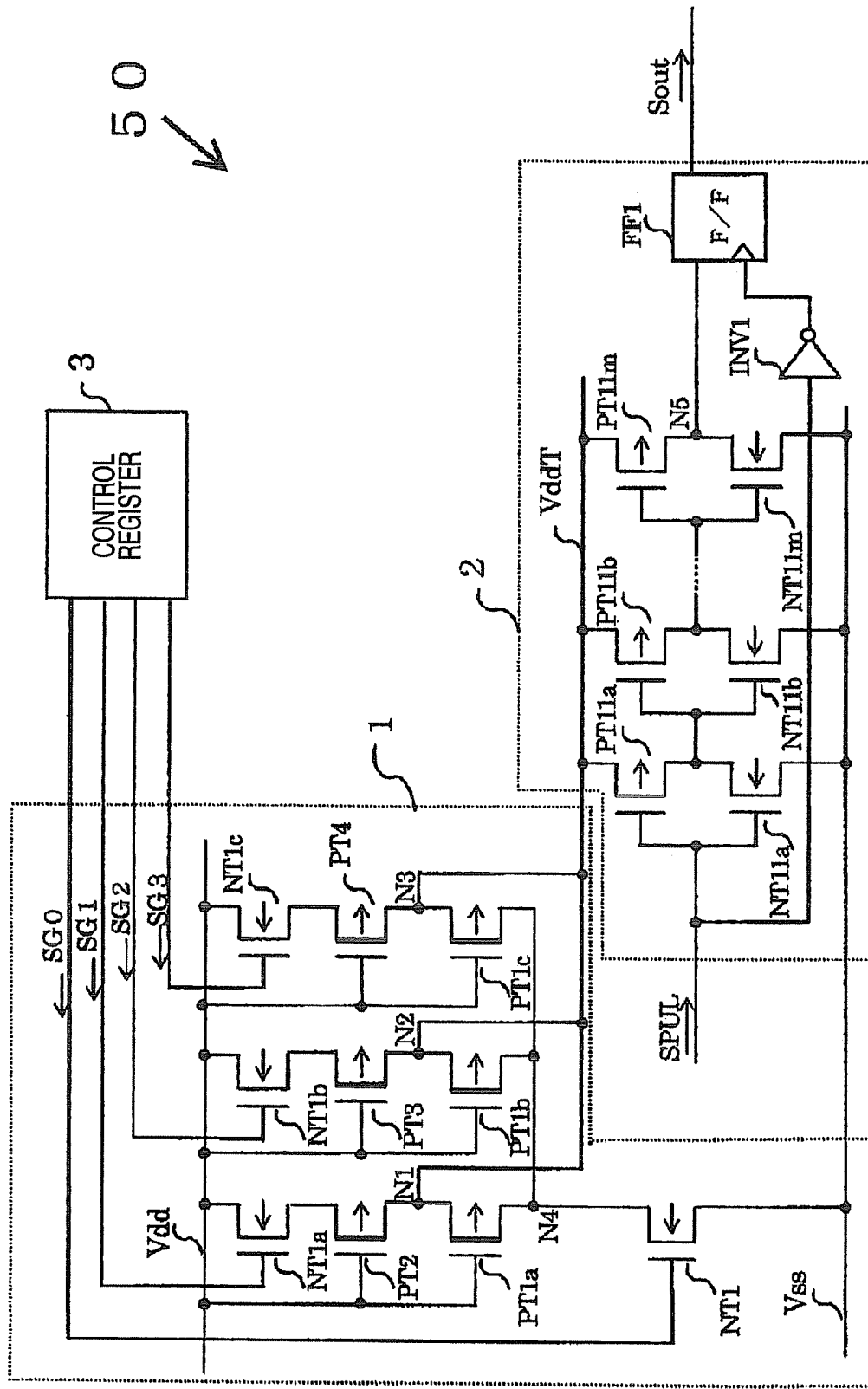
FIG. 1 is an exemplary circuit diagram illustrating a temperature detection circuit according to preferred embodiment.
Figure 2:
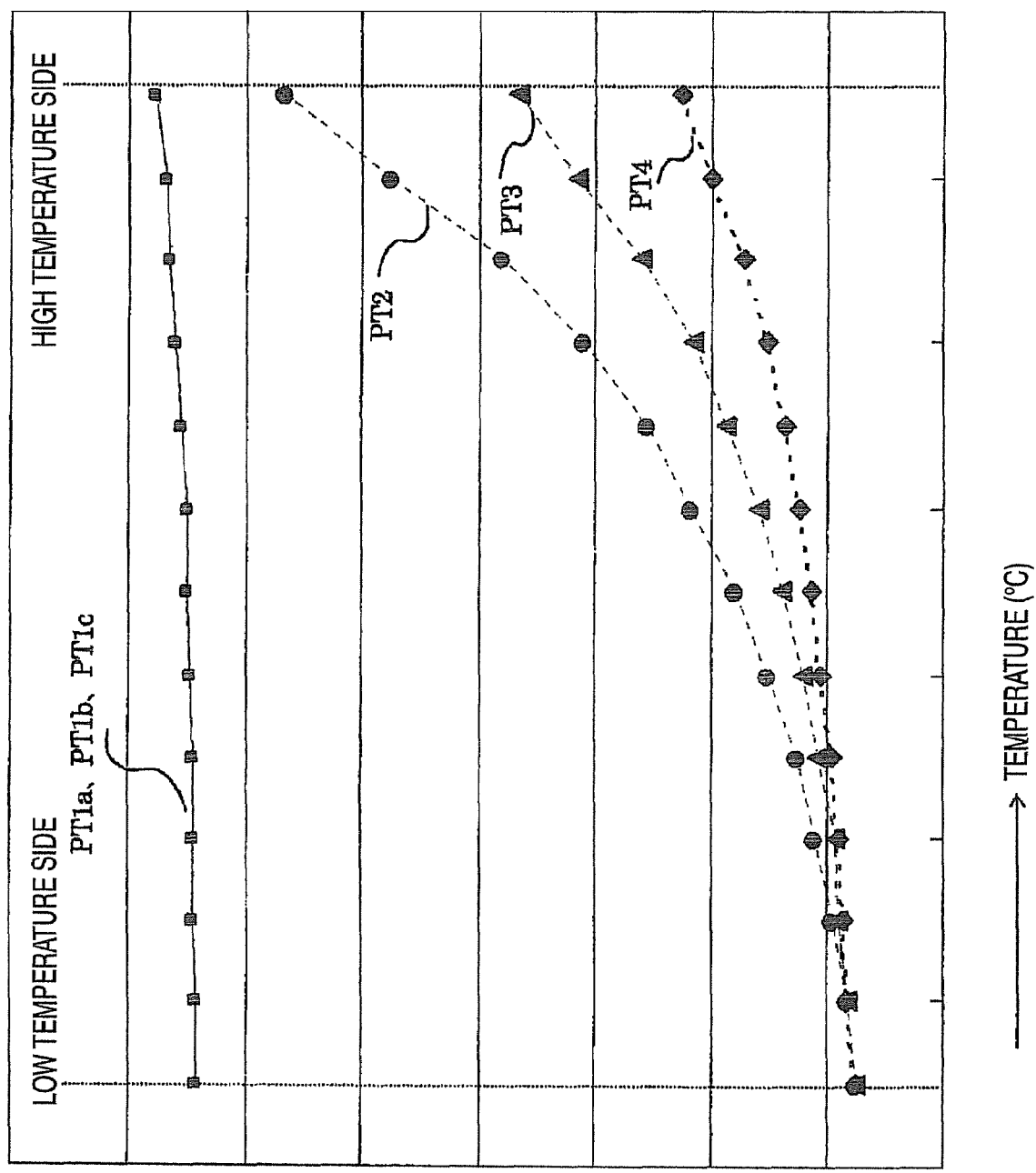
FIG. 2 is an exemplary graph illustrating the temperature dependence of the off-resistance of a D-type P-channel MOS transistor constituting a voltage generating circuit portion according to preferred embodiment.
Figure 3:
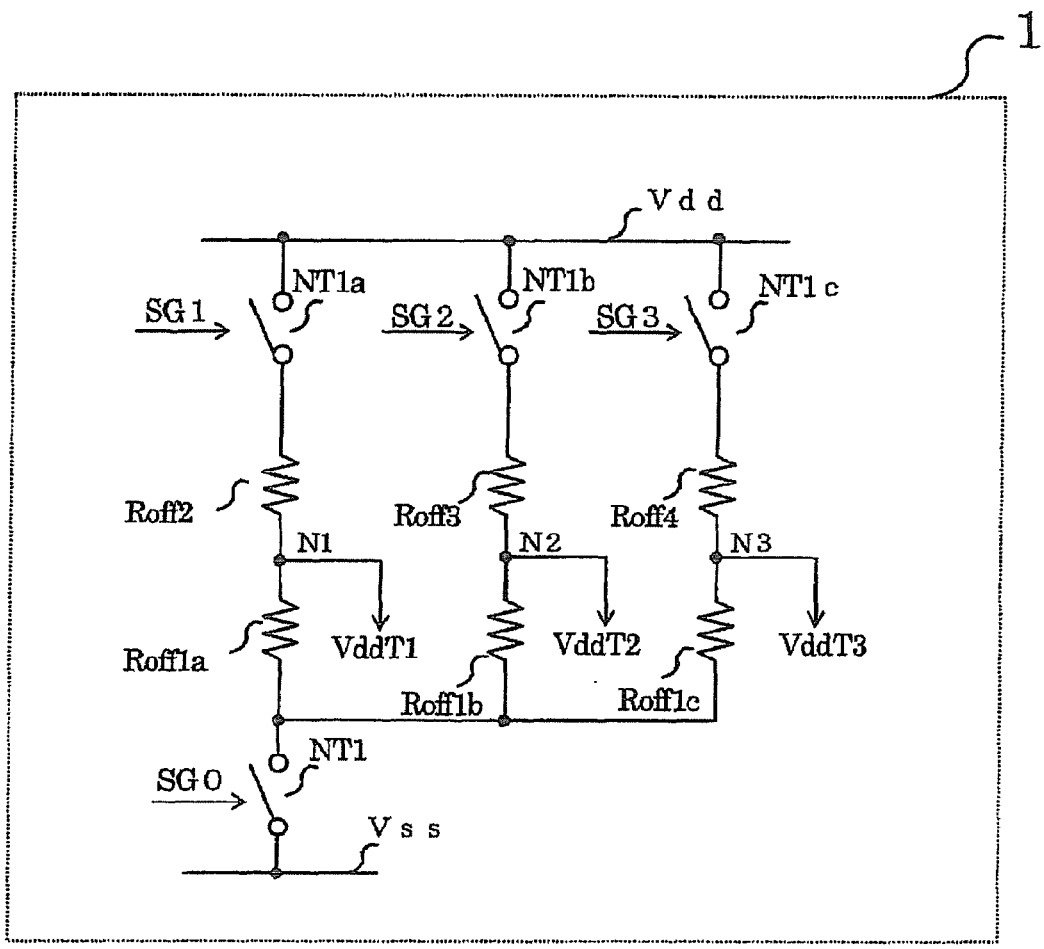
FIG. 3 is an exemplary diagram illustrating an operation of the voltage generating circuit portion according to preferred embodiment.
Figure 4:
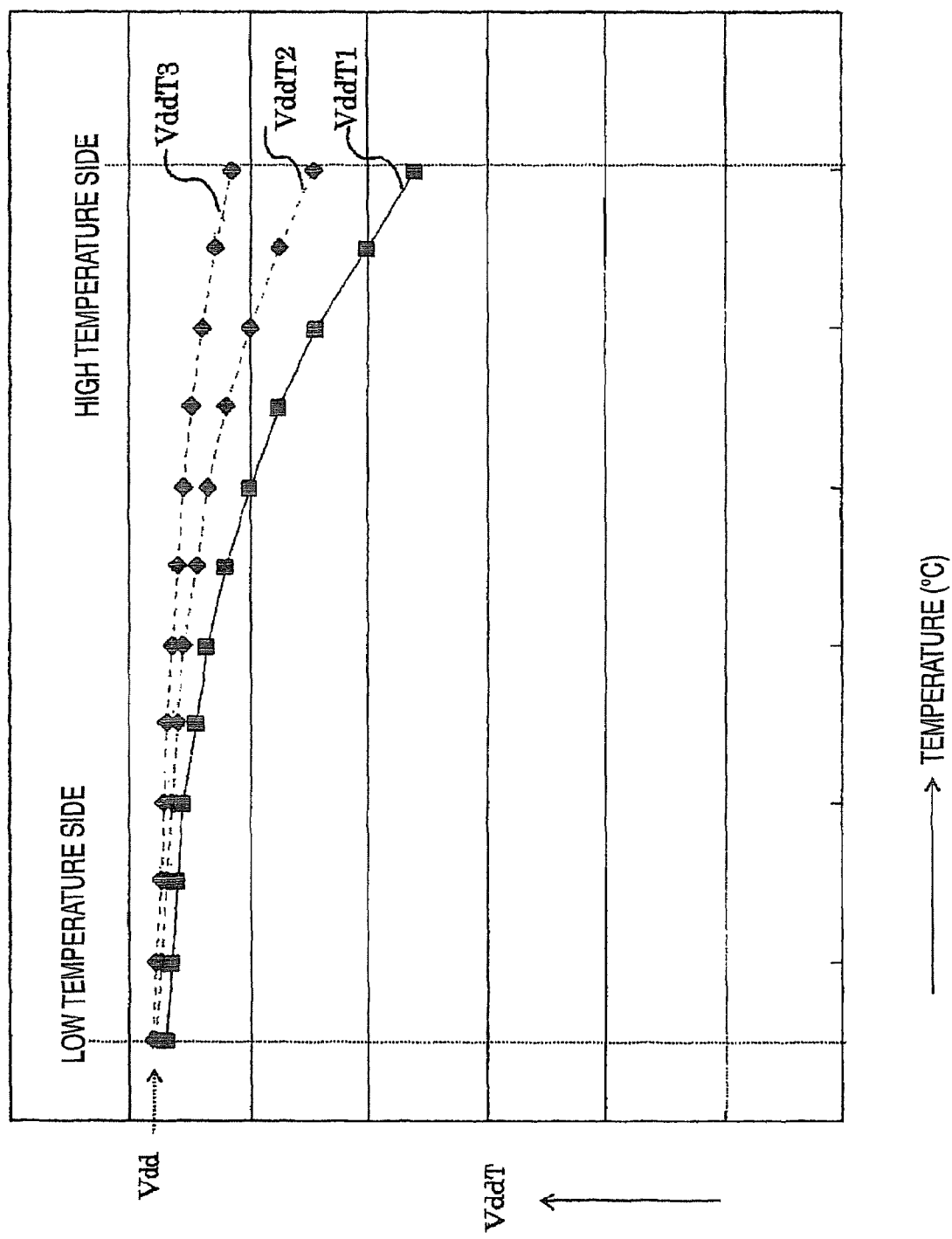
FIG. 4 is an exemplary graph illustrating the temperature dependence of a dropped high-potential-side power supply voltage output from the voltage generating circuit portion according to preferred embodiment.

First, a temperature detection circuit according to Embodiment 1 of the invention is described with reference to the accompanying drawings. FIG. 1 is a circuit diagram illustrating the temperature detection circuit according to Embodiment 1 of the invention. FIG. 2 is a graph illustrating the temperature dependence of the off-resistance of a D-type P-channel metal oxide semiconductor (MOS) transistor constituting a voltage generating circuit portion according to Embodiment 1 of the invention. FIG. 3 is a diagram illustrating an operation of the voltage generating circuit portion according to Embodiment 1 of the invention. FIG. 4 is a graph illustrating the temperature dependence of a dropped high-potential-side power supply voltage output from the voltage generating circuit portion according to Embodiment 1 of the invention. In the present embodiment, a temperature is detected using a dropped high-potential power supply voltage having temperature dependence, and an inverter chain.

As illustrated in FIG. 1, a temperature detection circuit 50 is provided with a voltage generating circuit portion 1, a detection portion 2, and a control register 3. A plurality of temperature detection circuits 50 are mounted on a semiconductor integrated circuit such as a system LSI or a system-on-a-chip (SoC) and detect the temperature of each part whose temperature rises due to a circuit operation. Electric characteristics, for example, a reference clock frequency used for a circuit operation and the impedance of an output driver are controlled in response to a change in temperature based on the temperature detected by the temperature detection circuits 50.

The control register 3 generates control signals SG0 to SG3. An operation of the voltage generating circuit portion 1 is controlled, based on the control signals SG0 to SG3 output from the control register 3.

The voltage generating circuit portion 1 is provided with an N-channel MOS transistor NT1, N-channel MOS transistors NT1a to NT1c, D-type P-channel MOS transistors PT1a to PT1c, and D-type P-channel MOS transistors PT2 to PT4. The voltage generating circuit portion 1 outputs a high-potential-side power supply voltage VddT, which is resistively divided using the off-resistance of each MOS transistor and is dropped. The voltage generating circuit portion 1 functions as a voltage dropping means.

Incidentally, the MOS transistor is referred to also as a metal oxide semiconductor field effect transistor (MOSFET). The MOS transistor and a metal insulator semiconductor (MIS) transistor are referred to also as insulated gate field effect transistors. Each of the N-channel MOS transistor NT1, and the N-channel MOS transistors NT1a to NT1c is an enhancement type (E-type) transistors and are turned on by applying a voltage having a "High"-level to a gate thereof. Thus, electric current flows between the source and the drain of each of the N-channel MOS transistor NT1, and the N-channel MOS transistors NT1a to NT1c.

Depression-type (D-type) P-channel MOS transistors PT1a to PT1c and depression-type (D-type) P-channel MOS transistors PT2 to PT4 are always turned on regardless of voltages to be applied to the gates thereof. Thus, electric current flows between the source and the drain of each of the D-type P-channel MOS transistors. As illustrated in FIG. 2, the off-resistance of each of the D-type P-channel MOS transistors PT1a to PT1c is relatively large. The temperature coefficient of the off-resistance of each of the D-type P-channel MOS transistors PT1a to PT1c is set at a positive (+) and small value. The off-resistances of the D-type P-channel MOS transistors PT2 to PT4 are substantially equal to one another at a low temperature side. The temperature coefficient of the off-resistance of each of the D-type P-channel MOS transistors PT2 to PT4 is set to be smaller than that of the off-resistance of each of the D-type P-channel MOS transistors PT1a to PT1c. The temperature coefficient of the off-resistance of the D-type P-channel MOS transistor PT4 is set at a positive (+) value which is larger than that of the off-resistance of each of the D-type P-channel MOS transistors PT1a to PT1c. The temperature coefficient of the off-resistance of the D-type P-channel MOS transistor PT3 is set at a positive (+) value which is larger than that of the off-resistance of the D-type P-channel MOS transistor PT4. The temperature coefficient of the off-resistance of the D-type P-channel MOS transistor PT2 is set at a positive (+) value which is larger than that of the off-resistance of the D-type P-channel MOS transistor PT3. The high-temperature-side off-resistance of the D-type P-channel MOS transistor PT2 is set to be smaller than that of each of the MOS transistors PT1a to PT1c.

The temperature coefficient of the off-resistance of each of the D-type P-channel MOS transistors PT1a to PT1c, the D-type P-channel MOS transistor PT2, the D-type P-channel MOS transistor PT3, and the D-type P-channel MOS transistor PT4 are changed. In this embodiment, a method of changing a temperature coefficient is to change the concentration of P-type impurities of a channel layer immediately under a gate. In a case where the concentration of P-type impurities is low (i.e., a sheet resistance is high), the temperature coefficient is positive (+) and large, similarly to diffusion resistance. As the concentration of P-type impurities increases (i.e., the sheet resistance decreases), the temperature coefficient is positive (+) and decreases, similarly to the diffusion resistance.

More specifically, the resistance of the channel layer of the D-type P-channel MOS transistor PT2 is set to be high. The resistance of the channel layer of the D-type P-channel MOS transistor PT3 is set to be lower than that of the channel layer of the D-type P-channel MOS transistor PT2. The resistance of the channel layer of the D-type P-channel MOS transistor PT4 is set to be lower than that of the channel layer of the D-type P-channel MOS transistor PT3. The resistance of the channel layer of the D-type P-channel MOS transistor PT4 is set to be lower than that of the channel layer of each of the D-type P-channel MOS transistors PT1a to PT1c.

The N-channel MOS transistor NT1a is such that the drain thereof is connected to a high-potential-side power supply voltage Vdd, and that a control signal SG1 is input to the gate thereof. The N-channel MOS transistor NT1a performs on-off operations based on the control signal SG1. The N-channel MOS transistor NT1b is such that the drain thereof is connected to the high-potential-side power supply voltage Vdd, and that a control signal SG2 is input to the gate thereof. The N-channel MOS transistor NT1b performs on-off operations based on the control signal SG2. N-channel MOS transistor NT1c is such that the drain thereof is connected to the high-potential-side power supply voltage Vdd, and that a control signal SG3 is input to the gate thereof. The N-channel MOS transistor NT1c performs on-off operations based on the control signal SG3.

The D-type P-channel MOS transistor PT2 is such that the source thereof is connected to the source of the N-channel MOS transistor NT1a, that the gate thereof is connected to the high-potential-side power supply voltage Vdd, and that the drain thereof is connected to a node N1. The D-type P-channel MOS transistor PT2 is always turned off (the off-resistance of the D-type P-channel MOS transistor PT2, which is in an off-state, is Roff2). The D-type P-channel MOS transistor PT1a is such that the source thereof is connected to a node N1, that the gate thereof is connected to the high-potential-side power supply voltage Vdd, and that the drain thereof is connected to a node N4. The D-type P-channel MOS transistor PT1a is always turned off (the off-resistance of the D-type P-channel MOS transistor PT1a, which is in an off-state, is Roff1a).

The D-type P-channel MOS transistor PT3 is such that the source thereof is connected to the source of the N-channel MOS transistor NT1b, that the gate thereof is connected to the high-potential-side power supply voltage Vdd, and that the drain thereof is connected to a node N2. The D-type P-channel MOS transistor PT3 is always turned off (the off-resistance of the D-type P-channel MOS transistor PT2, which is in an off-state, is Roff3). The D-type P-channel MOS transistor PT1b is such that the source thereof is connected to the node N2, that the gate thereof is connected to the high-potential-side power supply voltage Vdd, and that the drain thereof is connected to the node N4. The D-type P-channel MOS transistor PT1b is always turned off (the off-resistance of the D-type P-channel MOS transistor PT1b, which is in an off-state, is Roff1b).

The D-type P-channel MOS transistor PT4 is such that the source thereof is connected to the source of the N-channel MOS transistor NT1c, that the gate thereof is connected to the high-potential-side power supply voltage Vdd, and that the drain thereof is connected to a node N3. The D-type P-channel MOS transistor PT4 is always turned off (the off-resistance of the D-type P-channel MOS transistor PT4, which is in an off-state, is Roff4). The D-type P-channel MOS transistor PT1c is such that the source thereof is connected to the node N3, that the gate thereof is connected to the high-potential-side power supply voltage Vdd, and that the drain thereof is connected to the node N4. The D-type P-channel MOS transistor PT1c is always turned off (the off-resistance of the D-type P-channel MOS transistor PT1c, which is in an off-state, is Roff1c). The nodes N1 to N3 are connected to a low-potential-side power supply voltage VddT of the detecting portion 2.

The N-channel MOS transistor NT1 is such that the drain thereof is connected to the node N4, that the source thereof is connected to a low-potential-side power supply voltage Vss, and that a control signal SG0 is input to the gate thereof. The N-channel MOS transistor NT1 performs on-off operations, based on the control signal SG0. The low-potential-side power supply voltage Vss is connected to, e.g., a grounding terminal.

The N-channel MOS transistors NT1a to NT1c and the N-channel MOS transistor NT1 are switches which operate based on the control signals SG0 to SG3. The resistance (i.e., the on-resistance) of each of the N-channel MOS transistors NT1a to NT1c and the N-channel MOS transistor NT1, which are in an on-state, is set at a value that is lower by, e.g., one order of magnitude or more than the value of the resistance (i.e., the off-resistance) of each of the D-type P-channel MOS transistors PT1a to PT1c and the D-type P-channel MOS transistors PT2 to PT 4.

As illustrated in FIG. 3, in a case where the signal level of each of the control signals SG0 and SG1 is a "High"-level (i.e., that of each of the control signals SG2 and SG3 is a "Low"-level), the voltage generating circuit 1 outputs a high-potential-side power supply voltage VddT1, which is obtained by resistively dividing the high-potential-side power supply voltage Vdd, from the node N1 to the detecting portion 2. The high-potential-side power supply voltage VddT1 is expressed by the following expressions (1) and (2).

$$VddT1 \approx Vdd \times \{Roff1a/(Roff2+Roff1a)\} \quad \text{expression (1)}$$

$$VddT1 \approx Vdd \times \{Roff1/(Roff2+Roff1)\} \quad \text{expression (2)}$$

In a case where the signal level of each of the control signals SG0 to SG2 is a "High"-level (i.e., that of each of the control signals SG1 and SG3 is a "Low"-level), the voltage generating circuit 1 outputs a high-potential-side power supply voltage VddT2, which is obtained by resistively dividing the high-potential-side power supply voltage Vdd, from the node N2 to the detecting portion 2. The high-potential-side power supply voltage VddT2 is expressed by the following expressions (3) and (4).

$$VddT2 \approx Vdd \times \{Roff1b/(Roff2+Roff1b)\} \quad \text{expression (3)}$$

$$VddT2 \approx Vdd \times \{Roff1/(Roff3+Roff1)\} \quad \text{expression (4)}$$

In a case where the signal level of each of the control signals SG0 and SG3 is a "High"-level (i.e., that of each of the control signals SG1 and SG2 is a "Low"-level), the voltage generating circuit 1 outputs a high-potential-side power supply voltage VddT3, which is obtained by resistively dividing the high-potential-side power supply voltage Vdd, from the node N3 to the detecting portion 2. The high-potential-side power supply voltage VddT3 is expressed by the following expressions (5) and (6).

$$VddT3 \approx Vdd \times \{Roff1c/(Roff4+Roff1c)\} \quad \text{expression (5)}$$

$$VddT3 \approx Vdd \times \{Roff1/(Roff4+Roff1)\} \quad \text{expression (6)}$$

Incidentally, the resistances Roff1a, Roff1b, and Roff1c are set substantially at the same value Roff1. Thus, the resistances Roff1a, Roff1b, and Roff1c in the expressions (1), (3), and (5) are replaced with the resistance Roff1 to thereby obtain the expressions (2), (4), and (6).

As illustrated in FIG. 4, in a case where the signal level of each of the control signals SG0 and SG1 is a "High"-level (i.e., a case where the high-potential-side power supply voltage VddT1 is output), the value of the high-potential-side power supply voltage VddT supplied from the voltage generating circuit portion 1 to the detecting portion 2 largely drops as an ambient temperature rises. In a case where the signal level of each of the control signals SG0 and SG2 is a "High"-level (i.e., a case where the high-potential-side power supply voltage VddT2 is output), the drop of the high-potential-side power supply voltage VddT2 with respect to the rise of an ambient temperature is less than that of the high-potential-side power supply voltage VddT1. In a case where the signal level of each of the control signals SG0 and SG3 is a "High"-level (i.e., a case where the high-potential-side power supply voltage VddT3 is output), the drop of the high-potential-side power supply voltage VddT3 with respect to the rise of an ambient temperature is less than that of the high-potential-side power supply voltage VddT2. In the case of outputting the high-potential-side power supply voltage VddT3, the drop of the value of the voltage is smallest.

The detecting portion 2 is provided with an inverter INV1, a flip-flop FF1, an N-channel MOS transistor NT11a, an N-channel MOS transistor NT11b, an N-channel MOS transistor NT11m, a P-channel MOS transistor PT11a, a P-channel MOS transistor PT11b, and a P-channel MOS transistor PT11m. Incidentally, the N-channel MOS transistor NT11a, the N-channel MOS transistor NT11b, the N-channel MOS transistor NT11m, the P-channel MOS transistor PT11a, the P-channel MOS transistor PT11b, and the P-channel MOS transistor PT11m are of the enhancement type (E-type) and are turned on when a voltage is applied to the gate, so that when a voltage is applied to the gate of each of these MOS transistors, these MOS transistors are turned on. Then, electric current flows between the source and the drain thereof.

The P-channel MOS transistor PT11a is such that the source thereof is connected to the high-potential-side power supply voltage VddT, and that a pulse signal SPUL thereof is input to the gate thereof. The N-channel MOS transistor VT11a is such that the drain thereof is connected to the drain of the P-channel MOS transistor PT11a, that the source is connected to the low-potential-side power supply Vss, and that a pulse signal SPUL is input to the gate thereof. The P-channel MOS transistor PT11 and the N-channel MOS transistor constitute a first-stage inverter. Then, the pulse signal SPUL is reversed. A resultant signal is output.

The P-channel MOS transistor PT11b is such that the source thereof is connected to the high-potential-side power supply voltage VddT, and that an output signal of the first-stage inverter is input to the gate. The N-channel MOS transistor NT11b is such that the drain thereof is connected to the drain of the MOS transistor PT11b, that the source thereof is connected to the low-potential-side power supply voltage Vss, and that an output signal of the first-stage inverter is input to the gate thereof. The P-channel MOS transistor PT11b and the N-channel MOS transistor NT11b constitute a second-stage inverter and inverts a signal output from the first-stage inverter. Then, the second-stage inverter outputs the inverted signal.

The P-channel MOS transistor PT11m is such that the source thereof is connected to the high-potential-side power supply voltage VddT and that an output signal of an (m−1)-th inverter (not shown) is input to the gate thereof. The N-channel MOS transistor NT11m is such that the drain thereof is connected to the drain of the MOS transistor PT11b, that the source thereof is connected to the low-potential-side power supply voltage Vss, and that an output signal of the (m−1)-th stage inverter (not shown) is input to the gate thereof. The P-channel MOS transistor PT11m and the N-channel MOS transistor NT11m constitute an m-th stage inverter and inverts a signal output from the (m−1)-th stage inverter. Then, the (m−1)-th stage inverter outputs the inverted signal.

M-stage inverters shift the level of a pulse signal SPUL, which is an input signal, and outputs a signal delayed a predetermined time to the flip-flop FF1 from a node N5. The m-stage inverters delay a pulse signal. When the high-potential-side power supply voltage VddT is lower than the high-potential-side power supply voltage Vdd, the m-stage inverters further delay the pulse signal SPUL. When an increase in the temperature of a part of a semiconductor integrated circuit, in which the temperature detection circuit 50 is provided, is caused, the m-stage inverters delay the pulse signal SPUL. The m-stage inverters function as a delay means for delaying a pulse signal SPUL.

The inverter INV1 is provided between a high-potential-side power supply (not shown) VddT and a low-potential-side power supply (not shown) Vss. The inverter INV1 receives a pulse signal SPUL and outputs a signal, which is obtained by inverting a pulse signal SPUL, to the flip-flop FF1.

Preferably, the number of the m-stage inverters is selected so that the delay time of a pulse signal SPUL, which is delayed by the m-stage inverters, can be set to be longer than the delay time of a pulse signal SPUL, which is delayed by the inverter INV1, (to the extent that the delay time of a pulse signal SPUL, which is delayed by the inverter INV1 is negligible).

The flip-flop FF1 inputs an output signal of the m-th inverter (i.e., a signal output from the node N5) to a data port (not shown). The flip-flop FF1 latches data, which is to be input to the data port, on the basis of a signal output from the inverter INV1 and outputs the data in the form of an output signal Sout. That is, the data to be input to the data port is latched at a trailing edge of a pulse signal SPUL.

Figure 5:
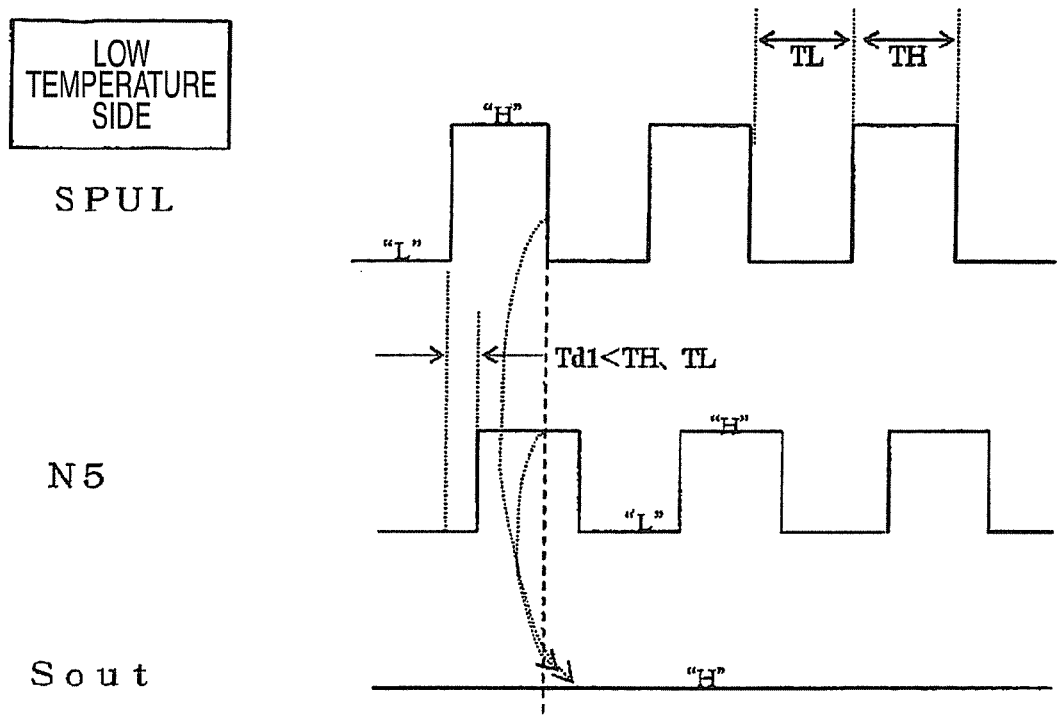
FIG. 5 is an exemplary timing chart illustrating an operation of the temperature detection circuit according to preferred embodiment.
Figure 5:
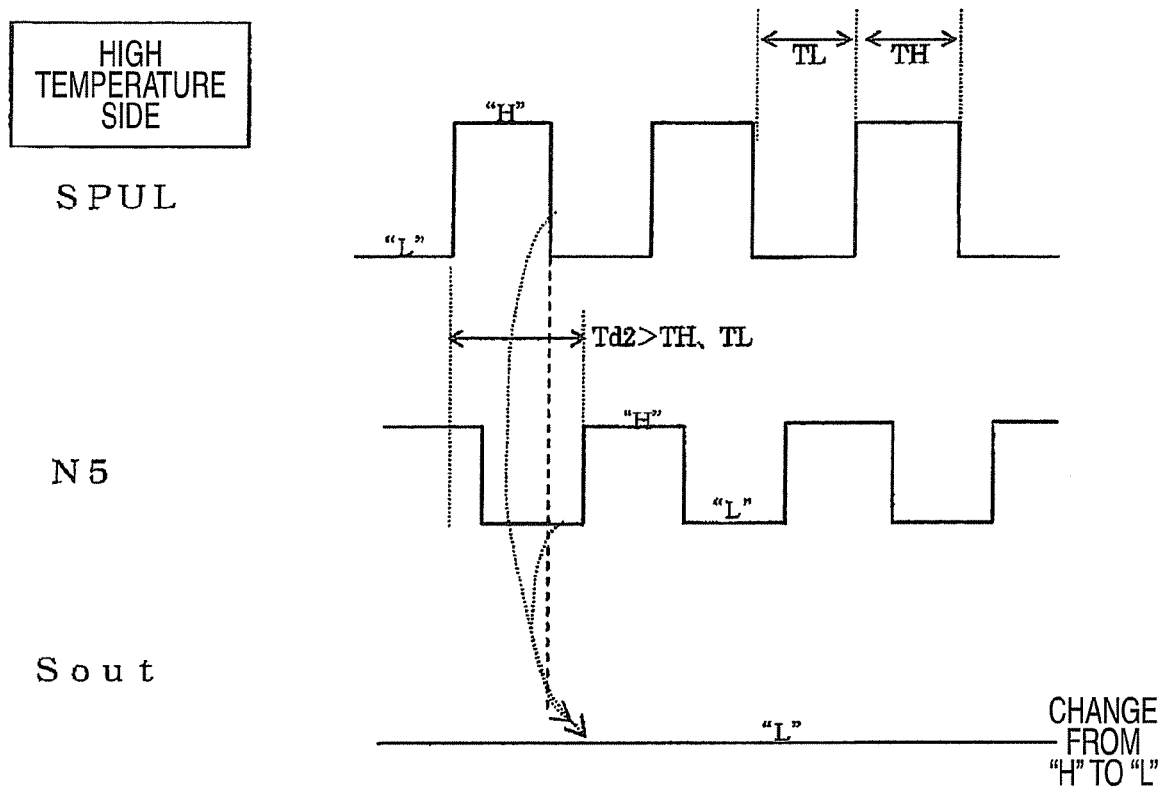
Figure 6:
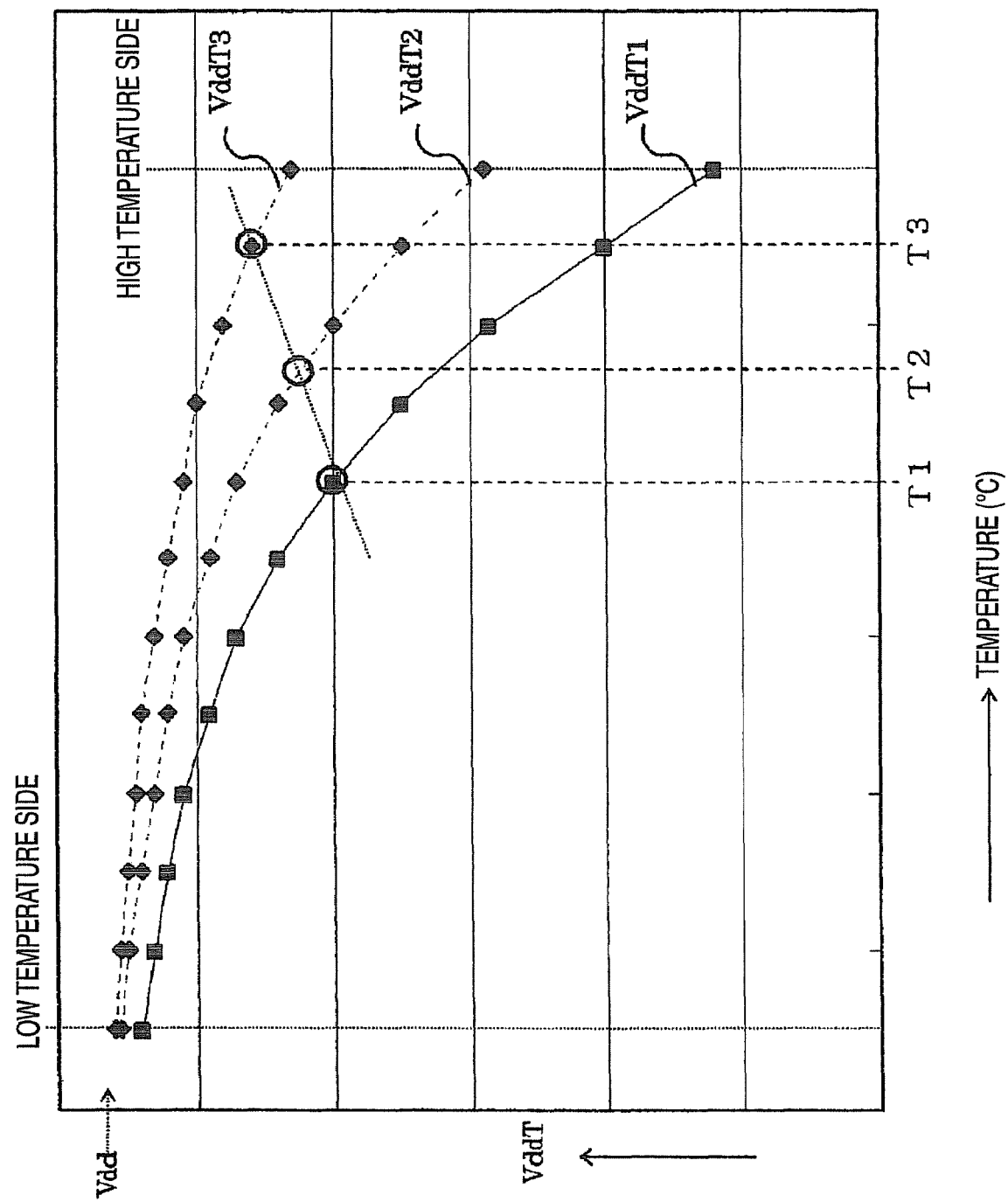
FIG. 6 is an exemplary graph illustrating a temperature detected by the temperature detection circuit according to preferred embodiment.

Next, an operation of the temperature detection circuit is described below with reference to FIGS. 5 and 6. FIG. 5 is a timing chart illustrating an operation of the temperature detection circuit. FIG. 6 is a graph illustrating a temperature detected by the temperature detection circuit.

As illustrated in FIG. 5, in a case where the ambient temperature of the part, in which the temperature detection circuit 50 is provided, in the semiconductor integrated circuit is relatively low, e.g., a room temperature of 25° C., a delay time Td1 of an output signal (i.e., a signal output from the node N5) of the m-stage inverters with respect to a pulse signal SPUL is set as follows.

$$Td1 < TH, TL \qquad \text{expression (7)}$$

where TH is a "High"-level time period of a pulse signal SPUL, and TL is a "Low"-level time period of a pulse signal SPUL. Each of the duties of a pulse signal SPUL is set to be 50% (i.e., each of the "High"-level time period and the "Low"-level time period is 50%).

The flip-flop FF1 latches data (corresponding to the "High"-level of a pulse signal SPUL) output from the node N5 at a trailing edge of the pulse signal SPUL. Then, the flip-flop FF1 outputs the data in the form of the output signal Sout.

Next, when the ambient temperature of the part, in which the temperature detection circuit 50 is provided, in the semiconductor integrated circuit rises, and the resistively divided high-potential-side power supply voltage VddT is dropped, a delay time Td2 of an output signal of the m-stage inverters (i.e., a signal output from the node N5) is set to meet the following expression (8).

$$Td2 > TH, TL \qquad \text{expression (8)}$$

The flip-flop FF1 latches data (corresponding to the "Low"-level) output from the node N5 at a trailing edge of a pulse signal SPUL. Then, the flip-flop FF1 outputs the data in the form of an output signal Sout. That is, when the temperature rises to a predetermined value, so that the delay time of the m-stage inverter increases, the signal level of the output signal Sout changes from the "High"-level to the "Low"-level. Thus, the flip-flop FF1 functions as a temperature detection means. In the present embodiment, the flip-flop FF1 is used. However, a latch circuit, which detects a trailing edge of a pulse signal PULS, can be used, instead of the flip-flop FF1. In such a case, the inverter INV1 is unnecessary.

As illustrated in FIG. 6, in a case where the control signals SG0 and SG1 are selected (or activated) in the temperature detection circuit 50, the temperature T1 of the part, in which the temperature detection circuit 50 is provided, can be detected in the semiconductor integrated circuit. In a case where the control signals SG0 and SG2 are selected (or activated) in the temperature detection circuit 50, the temperature T2 of the part, in which the temperature detection circuit 50 is provided, can be detected in the semiconductor integrated circuit (the temperature T2 is higher than the temperature T1). In a case where the control signals SG0 and SG3 are selected (or activated) in the temperature detection circuit 50, the temperature T3 of the part, in which the temperature detection circuit 50 is provided, can be detected in the semiconductor integrated circuit (the temperature T3 is higher than the temperature T2). That is, the temperature detection circuit 50 performs the three-condition monitoring of the part, in which the temperature detection circuit 50 is provided, in the semiconductor integrated circuit.

Incidentally, the relationship among the high-potential-side power supply voltage VddT1 (T1) at the temperature T1, the high-potential-side power supply voltage VddT2 (T2) at the temperature T2, and the high-potential-side power supply voltage VddT3 (T3) at the temperature T3 is given by the following expression (9).

$$VddT1(T1) < VddT2(T2) < VddT3(T3) \qquad (9)$$

As described above, the temperature detection circuit according to the present embodiment is provided with the voltage generating circuit portion 1, the detecting portion 2, and the control register 3. A plurality of temperature detection circuits 50 are mounted on the semiconductor integrated circuit, e.g., a system LSI or an SoC and detect the temperature of each part whose temperature rises due to a circuit operation. The control register 3 generates the control signals SG0 to SG3 and controls an operation of the voltage generating circuit portion 1. The voltage generating circuit portion 1 is provided with the N-channel MOS transistor NT1, the N-channel MOS transistor NT1a to NT1c, the D-type P-channel MOS transistor PT1a to PT1c, and the D-type P-channel MOS transistors PT2 to PT4. The voltage generating circuit portion 1 outputs the high-potential-side power supply voltage VddT, which is dropped by resistance division using the off-resistance of each D-type P-channel MOS transistor, to the detecting portion 2. The detecting portion 2 is provided with the inverter INV1, the flip-flop FF1, the N-channel MOS transistor NT11a, the N-channel MOS transistor NT11b, the N-channel MOS transistor NT11m, the P-channel MOS transistor PT11a, the P-channel MOS transistor PT11b, and the P-channel MOS transistor PT11m. The N-channel MOS transistor NT11a, the N-channel MOS transistor NT11b, the N-channel MOS transistor NT11m, the P-channel MOS transistor PT11a, the P-channel MOS transistor PT11b, and the P-channel MOS transistor PT11m constitutes the m-stage inverters. The m-stage inverter chain is provided between the high-potential-side power supply VddT and the low-potential-side power supply Vss. A pulse signal SPUL s input to the m-stage inverter chain. Then, the m-stage inverter chain outputs a pulse signal SPUL obtained by shifting the level thereof and by being delayed a predetermined time. The flip-flop FF1 inputs the pulse signal PULS delayed by the m-stage inverter chain and latches the data input to th data port at a trailing edge of the pulse signal SPUL.

Thus, a temperature can be measured using a temperature detection circuit mounted on the semiconductor integrated circuit. Consequently, the mounting cost of the temperature detection circuit can considerably be reduced, as compared with conventional temperature detection circuits. Also, the mounting area of the temperature detection circuit can considerably be reduced, as compared with conventional temperature detection circuits. Additionally, a plurality of temperature detection circuits can appropriately be mounted on the semiconductor integrated circuit as temperature sensors, if necessary. Accordingly, the temperature of the entirety of a semiconductor integrated circuit chip can be monitored.

Incidentally, according to the present embodiment, the voltage generating circuit portion 1 is provided with the D-type P-channel MOS transistors and generates the dropped high-potential-side power supply voltage, which has temperature dependence, using the off-resistance of each of the D-type P-channel MOS transistors. However, D-type N-channel MOS transistors can be used, instead of the D-type P-channel MOS transistors.

In this case, preferably, the gate of each of the D-type N-channel MOS transistors is connected to the low-potential side power supply Vss. Although the temperature detection circuit 50 is constituted by the MOS transistors in the present embodiment, the temperature detection circuit 50 can be constituted by MIS transistors (more particularly, metal insulator semiconductor field effect transistors (MISFETs)). In addition, although the present embodiment uses the inverter chain as delay means, a buffer chain or the like can be used as the delay means. Although the voltage generating circuit portion 1 is provided with three rows of the cascade-connected D-type P-channel MOS transistors and outputs three kinds of the high-potential-side power supply voltages VddT dropped by resistance division, the voltage generating circuit portion can be provided with n-rows (incidentally, "n" is 1, 2, or 4 or more) of D-type P-channel MOS transistors and output n-kinds of high-potential-side power supply voltages dropped by resistance division.

Embodiment 2

Figure 7:
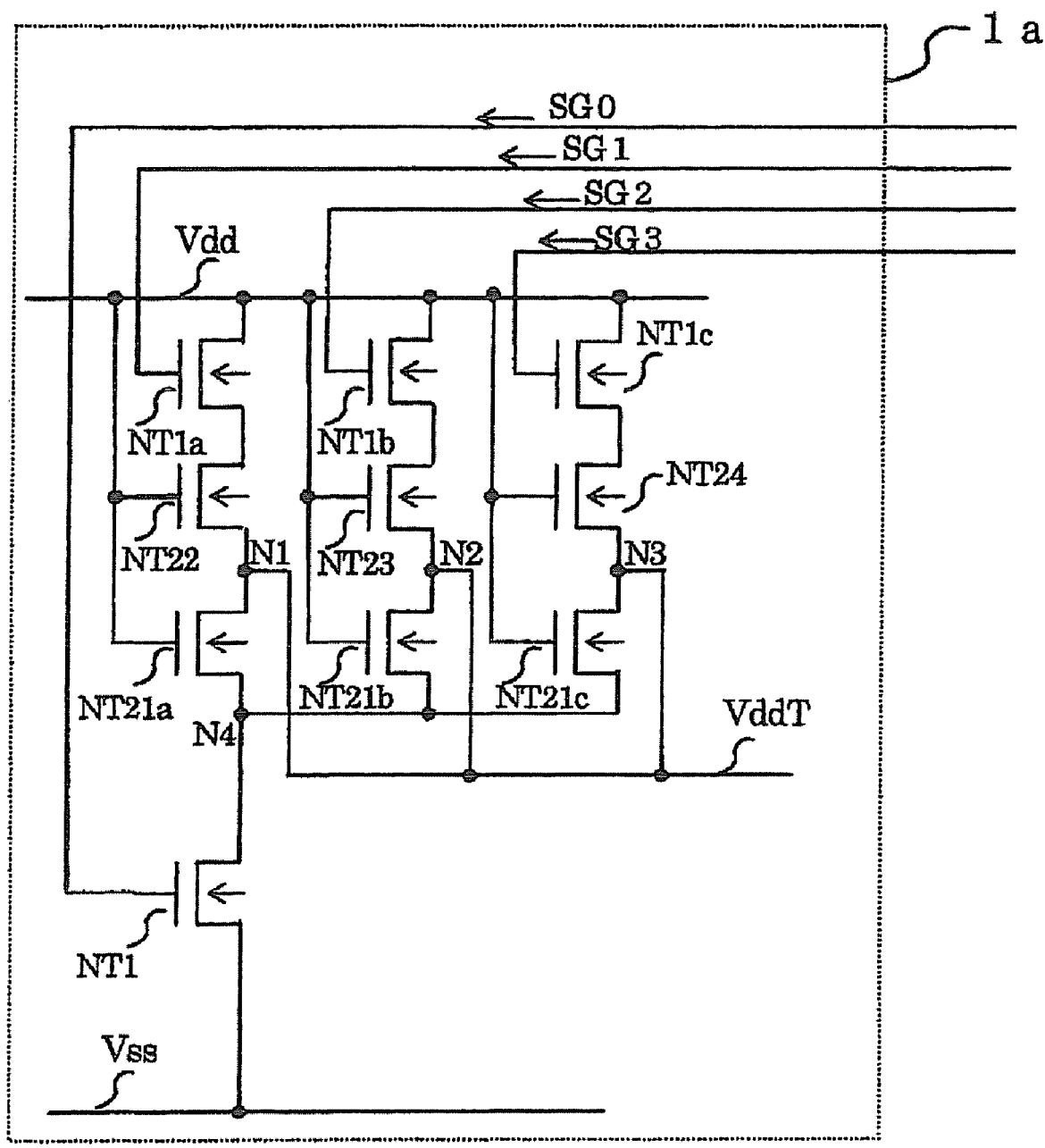
FIG. 7 is an exemplary circuit diagram illustrating a voltage generating circuit portion according to preferred embodiment.
Figure 8:
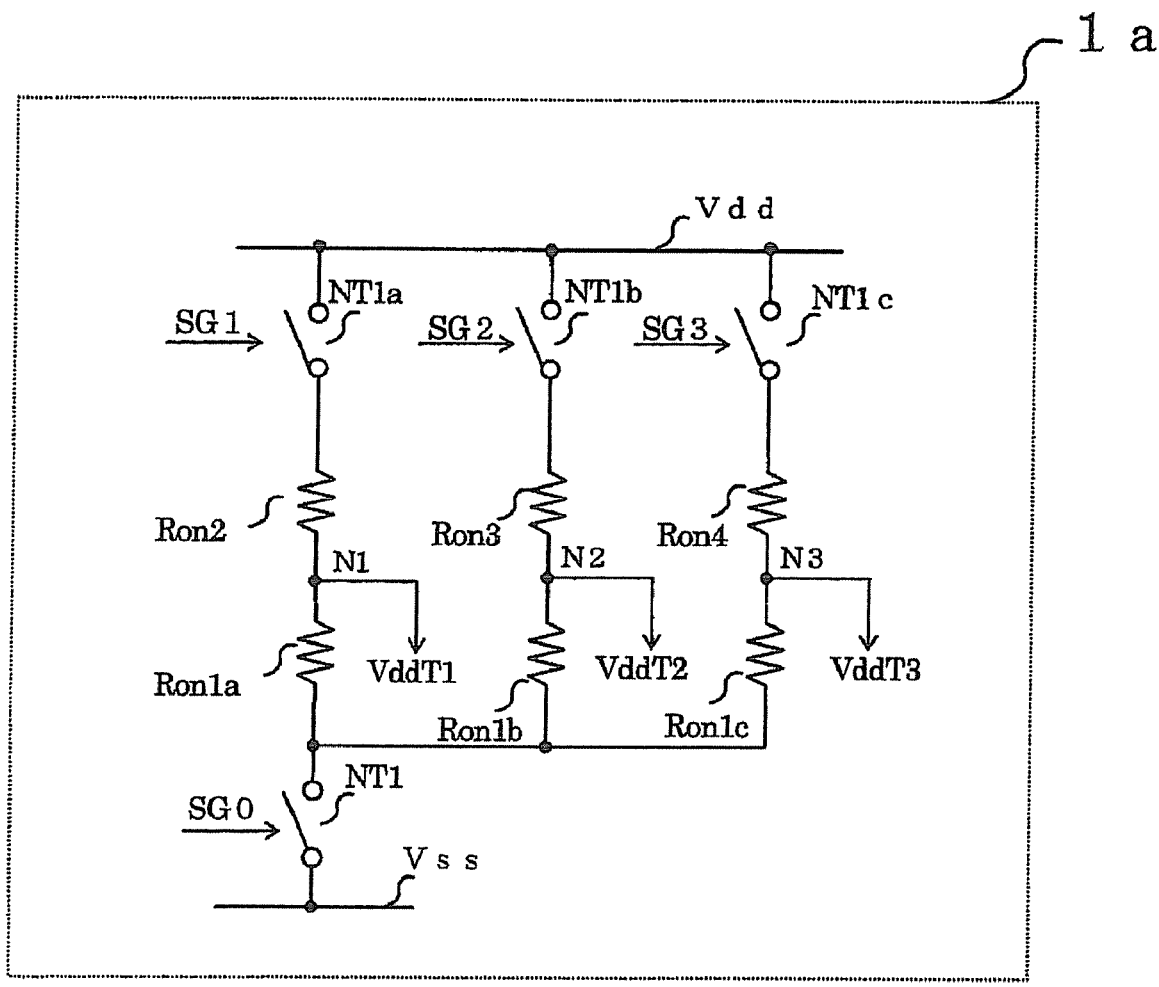
FIG. 8 is an exemplary diagram illustrating an operation of the voltage generating circuit portion according to preferred embodiment.

Next, a temperature detection circuit according to Embodiment 2 of the invention is described below with reference to the accompanying drawings. FIG. 7 is a circuit diagram illustrating the voltage generating circuit portion according to Embodiment 2 of the invention. FIG. 8 is a diagram illustrating an operation of the voltage generating circuit portion according to Embodiment 2 of the invention The voltage generating circuit portion according to the present embodiment generates a dropped high-potential-side power supply voltage, which has temperature dependence, using the on-resistance of an N-channel MIS transistor.

Hereinafter, components of the present embodiment, which are the same as associated-components of Embodiment 1, are designated by the same reference numerals as reference numerals designating the associated-components used in Embodiment 1. Thus, the description of such components of Embodiment 2 is omitted. In the following description, only the differences between Embodiment 1 and Embodiment 2 are described.

As illustrated in FIG. 7, the voltage generating circuit portion 1a is provided with an N-channel MOS transistor NT1, N-channel MOS transistors NT1a to NT1c, N-channel MIS transistors NT21a to NT21c, and N-channel MIS transistors NT22 to NT24. The voltage generating circuit portion 1a outputs a dropped high-potential-side power supply voltage, which is obtained by resistance division using the on-resistance of each MIS transistor, to the detecting portion 2. The temperature detection circuit provided with the voltage generating circuit portion 1a has the same configuration as that of the temperature detection circuit according to Embodiment 1 except a voltage generating circuit portion 1a.

Incidentally, the MIS transistor is referred to also as a metal insulator semiconductor field effect transistor (MISFET). The N-channel MIS transistors NT21a to NT21c and the N-channel MIS transistors NT22 to NT24 are transistors of the enhancement type (E-type). Each of the N-channel MIS transistors is turned on by applying a voltage having an "High"-level to the gate. Thus, each of the N-channel MIS transistors is such that an electric current flows between the source and the drain thereof.

The on-resistance of each of the N-channel MIS transistors NT21a to NT21c is relatively large. In addition, the temperature coefficient of the on-resistance thereof is positive (+) and is set to be small. At the low temperature side, the on resistance of each of N-channel MIS transistors NT22 to NT24 are substantially same and are set to be smaller than N-channel MIS transistor NT21a to NT21c. The temperature coefficient of the on-resistance of the N-channel MIS transistor NT24 is positive (+) and is set to be larger than that of the on-resistance of each of the N-channel MIS transistors NT21a to NT21c. The temperature coefficient of the on-resistance of the MIS transistor NT23 is positive (+) and is set to be larger than that of the on-resistance of the N-channel MIS transistor NT24. The temperature coefficient of the on-resistance of the MIS transistor NT22 is positive (+) and is set to be larger than that of the on-resistance of the N-channel MIS transistor NT23. The high-potential-side on-resistance of the N-channel MIS transistor NT22 is set to be smaller than that of each of the N-channel MIS transistors NT21a to MT21c.

The temperature coefficient of the on-resistance of each of the N-channel MIS transistors NT21a to NT21c and the N-channel MIS transistors NT22 to NT24 are changed. In the second embodiment, a method for changing the temperature coefficient is to apply MIS transistors, each of which is provided on an insulating film (i.e., on a field insulating film) and uses a polysilicon film as the material of each of the channel portion and a back gate, to the N-channel MIS transistors NT21a to NT21c and the N-channel MIS transistors NT22 to NT24.

In a case where the polysilicon film is relatively thick, the N-channel MIS transistor provided on the insulating film (field insulating film) is similar to the N-channel MIS transistor or the N-channel MOS transistor formed on a silicon substrate in that the temperature coefficient of the on-resistance is positive (+) and has a relatively large value. The reason is that when the temperature thereof rises, the carrier mobility and the on-current thereof are reduced due to thermal scattering effects, and that consequently, the on-resistance thereof is increased.

In a case where the thickness of the polysilicon film is gradually reduced, the temperature coefficient of the on-resistance of the N-channel MIS transistor provided on the insulating film (field insulating film) is positive (+) and has a value smaller than that in a case where the polysilicon film is relatively thick. The reason is that the reduction in the carrier mobility is restrained, and that the reduction in the on-current is restrained. Consequently, an increase in the on-resistance is restrained.

In a case where the thickness of the polysilicon film is reduced still more, the temperature coefficient of the on-resistance of the N-channel MIS transistor provided on the insulating film (field insulating film) is substantially 0. The reason is that the carrier mobility is substantially constant, and that the on-current is substantially constant. Consequently, the on-resistance is substantially constant.

More specifically, MIS transistors, each of which uses a thin polysilicon film as the channel portion and a back gate, are used as the N-channel MIS transistors NT21a to NT21c. An MIS transistor using a polysilicon film, which is thicker than the N-channel MIS transistors NT21a to NT21c, is used as the N-channel MIS transistor NT 24. An MIS transistor using a polysilicon film, which is thicker than the N-channel MIS transistor NT24, is used as the N-channel MIS transistor NT23. An MIS transistor using a polysilicon film, which is thicker than the N-channel MIS transistor NT23, is used as the N-channel MIS transistor NT22.

The N-channel MIS transistor NT 22 is such that the drain thereof is connected to the source of the MOS transistor NT1a, that the gate thereof is connected to the high-potential-side power supply Vdd, and that the source thereof is connected to the node N1. The N-channel MIS transistor NT 22 is always turned on (the on-resistance of the N-channel MIS transistor NT 22, which is in an on-state, is Ron2). The N-channel MIS transistor NT 21a is such that the drain thereof is connected to the node N1, that the gate thereof is connected to the high-potential-side power supply Vdd, and that the source thereof is connected to the node N4. The N-channel MIS transistor NT 21a is always turned on (the on-resistance of the N-channel MIS transistor NT 21a, which is in an on-state, is Ron1a).

The N-channel MIS transistor NT 23 is such that the drain thereof is connected to the source of the MOS transistor NT1b, that the gate thereof is connected to the high-potential-side power supply Vdd, and that the source thereof is connected to the node N2. The N-channel MIS transistor NT 23 is always turned on (the on-resistance of the N-channel MIS transistor NT 23, which is in an on-state, is Ron3). The N-channel MIS transistor NT 21b is such that the drain thereof is connected to the node N2, that the gate thereof is connected to the high-potential-side power supply Vdd, and that the source thereof is connected to the node N4. The N-channel MIS transistor NT 21b is always turned on (the on-resistance of the N-channel MIS transistor NT 21b, which is in an on-state, is Ron1b).

The N-channel MIS transistor NT 24 is such that the drain thereof is connected to the source of the MOS transistor NT1c, that the gate thereof is connected to the high-potential-side power supply Vdd, and that the source thereof is connected to the node N3. The N-channel MIS transistor NT 24 is always turned on (the on-resistance of the N-channel MIS transistor NT 24, which is in an on-state, is Ron4). The N-channel MIS transistor NT 21c is such that the drain thereof is connected to the node N3, that the gate thereof is connected to the high-potential-side power supply Vdd, and that the source thereof is connected to the node N4. The N-channel MIS transistor NT 21c is always turned on (the on-resistance of the N-channel MIS transistor NT 21c, which is in an on-state, is Ron1c). The nodes N1 to N3 are connected to the low-potential-side power supply VddT of the detecting portion 2.

The N-channel MOS transistors NT1a to NT1c and the N-channel MOS transistor NT1 are switches which operate based on the control signals SG0 to SG3. The resistance (i.e., the on-resistance) of each of the N-channel MOS transistors NT1a to NT1c and the N-channel MOS transistor NT1, which are in an on-state, is set at a value that is lower by, e.g., one order of magnitude or more than the value of the resistance (i.e., the on-resistance) of each of the N-channel MOS transistors NT21a to NT21c and the N-channel MOS transistors NT22 to NT24.

As illustrated in FIG. 8, in a case where the signal level of each of the control signals SG0 and SG1 is a "High"-level (i.e., that of each of the control signals SG2 and SG3 is a "Low"-level), the voltage generating circuit 1a outputs a high-potential-side power supply voltage VddT1, which is obtained by resistively dividing the high-potential-side power supply voltage Vdd, from the node N1 to the detecting portion 2. The high-potential-side power supply voltage VddT1 is expressed by the following expressions (10) and (11).

$$VddT1 \approx Vdd \times \{Ron1a/(Ron2+Ron1a)\} \quad \text{expression (10)}$$

$$VddT1 \approx Vdd \times \{Ron1/(Ron2+Ron1)\} \quad \text{expression (11)}$$

In a case where the signal level of each of the control signals SG0 to SG2 is a "High"-level (i.e., that of each of the control signals SG1 and SG3 is a "Low"-level), the voltage generating circuit 1 outputs a high-potential-side power supply voltage VddT2, which is obtained by resistively dividing the high-potential-side power supply voltage Vdd, from the node N2 to the detecting portion 2. The high-potential-side power supply voltage VddT2 is expressed by the following expressions (12) and (13).

$$VddT2 \approx Vdd \times \{Ron1b/(Ron3+Ron1b)\} \quad \text{expression (12)}$$

$$VddT2 \approx Vdd \times \{Ron1/(Ron3+Ron1)\} \quad \text{expression (13)}$$

In a case where the signal level of each of the control signals SG0 and SG3 is a "High"-level (i.e., that of each of the control signals SG1 and SG2 is a "Low"-level), the voltage generating circuit 1 outputs a high-potential-side power supply voltage VddT3, which is obtained by resistively dividing the high-potential-side power supply voltage Vdd, from the node N3 to the detecting portion 2. The high-potential-side power supply voltage VddT3 is expressed by the following expressions (5) and (6).

$$VddT3 \approx Vdd \times \{Ron1c/(Ron4+Ron1c)\} \quad \text{expression (14)}$$

$$VddT3 \approx Vdd \times \{Ron1/(Ron4+Ron1)\} \quad \text{expression (15)}$$

Incidentally, the resistances Ron1a, Ron1b, and Ron1c are set substantially at the same value Ron1. Thus, the resistances Ron1a, Ron1b, and Ron1c in the expressions (10), (12), and (14) are replaced with the resistance Ron1 to thereby obtain the expressions (11), (13), and (15).

The high-potential power supply voltage VddT, which is output from the voltage generating circuit 1a and is obtained by dropping the high-potential-side power supply voltage Vdd by resistance division, is output to the detecting portion 2. The temperature detection circuit having the voltage generating circuit 1a performs the three-condition monitoring of the temperature of a part, in which the temperature detection circuit is provided, in a semiconductor integrated circuit, based on the dropped high-potential power supply voltage VddT, similarly to Embodiment 1.

As described above, the temperature detection circuit according to the present embodiment is provided with the voltage generating circuit portion 1a, the detecting portion 2, and the control register 3. The voltage generating circuit portion 1a is provided with the N-channel MOS transistor NT1, the N-channel MOS transistors NT1a to NT1c, the N-channel MIS transistors NT1a to NT21c, and the N-channel MIS transistors NT22 to NT24. The voltage generating circuit portion 1a outputs a dropped high-potential-side power supply voltage, which is obtained by resistance division using the on-resistance of each of the N-channel MIS transistors, to the detecting portion 2.

Thus, a temperature can be measured using the temperature detection circuit mounted on the semiconductor integrated circuit. Consequently, the mounting cost of the temperature detection circuit can considerably be reduced, as compared with conventional temperature detection circuits. Also, the mounting area of the temperature detection circuit can considerably be reduced, as compared with conventional temperature detection circuits. Additionally, a plurality of temperature detection circuits can appropriately be mounted on the semiconductor integrated circuit as temperature sensors, if necessary. Accordingly, the temperature of the entirety of a semiconductor integrated circuit chip can be monitored.

Incidentally, according to the present embodiment, the voltage generating circuit portion 1a is provided with the E-type N-channel MIS transistors and generates the dropped high-potential-side power supply voltage VddT, which has temperature dependence, using the on-resistances of the E-type N-channel MIS transistors. However, E-type P-channel MIS transistors can be used, instead of the E-type N-channel MIS transistors. In this case, preferably, the gate of each of the E-type P-channel MIS transistors is connected to the low-potential-side power supply Vss.

Embodiment 3

Figure 9:
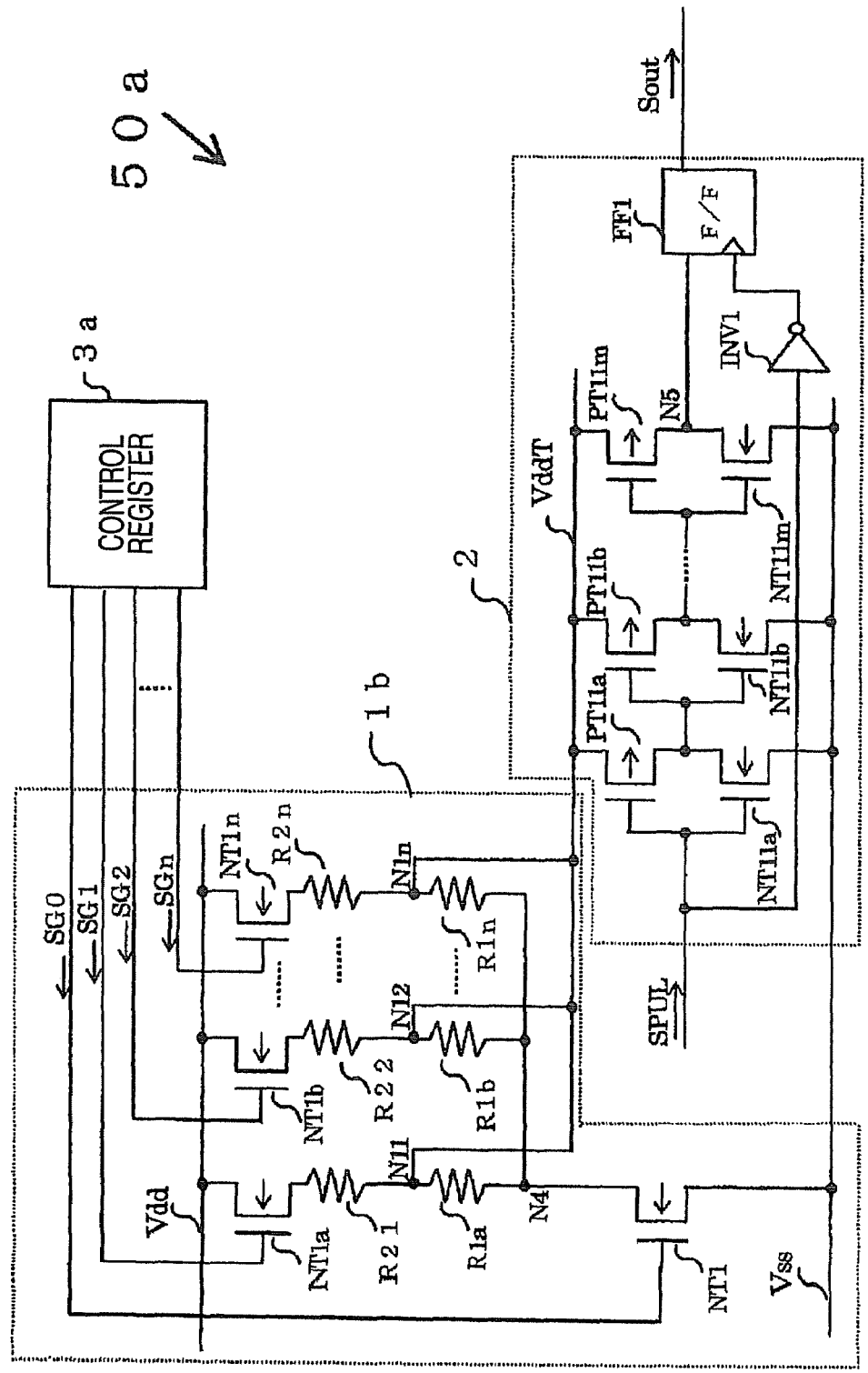
FIG. 9 is an exemplary circuit diagram illustrating a temperature detection circuit according to preferred embodiment.
Figure 10:
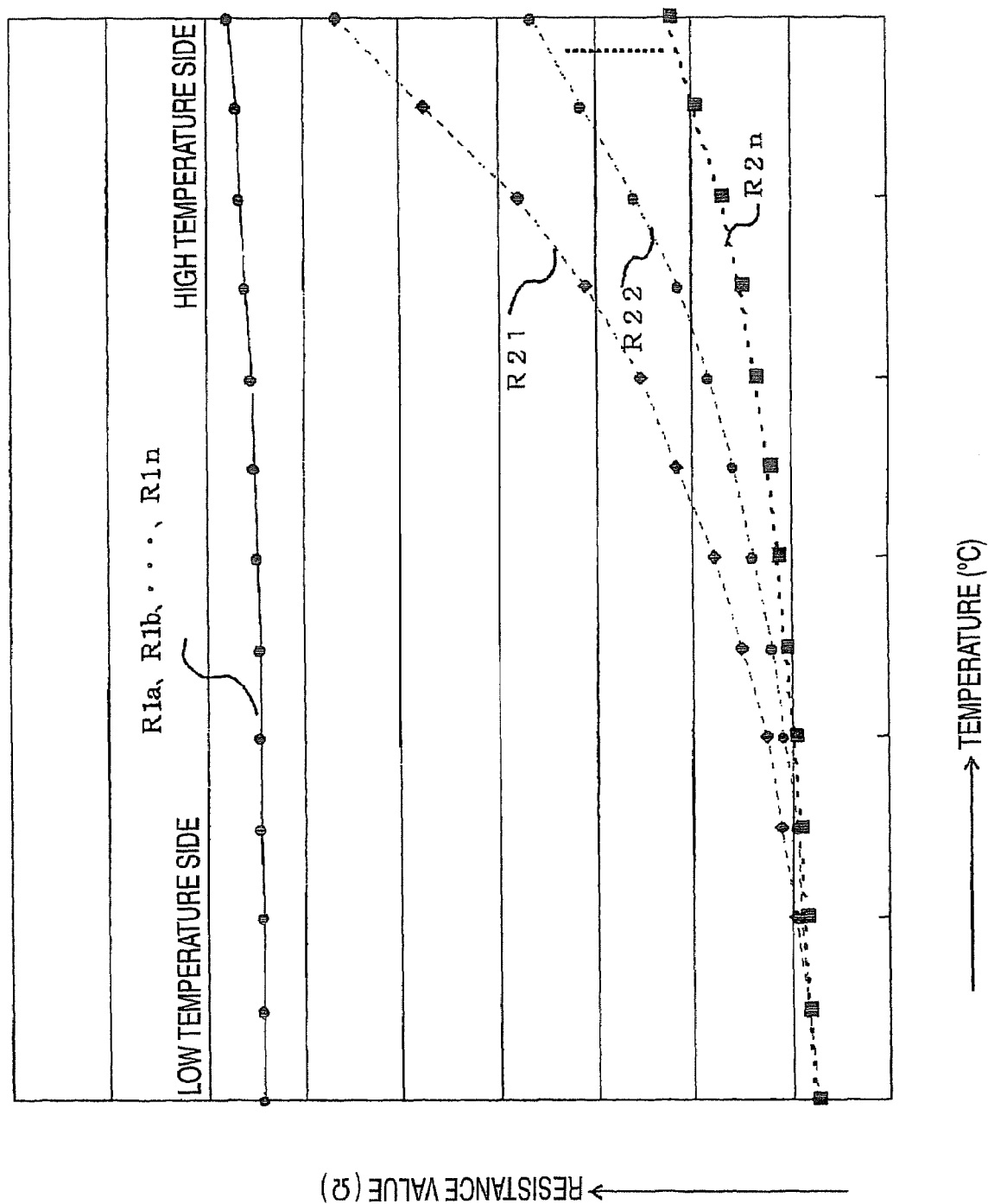
FIG. 10 is an exemplary graph illustrating the temperature dependence of resistances constituting a voltage generating circuit portion according to preferred embodiment.
Figure 11:
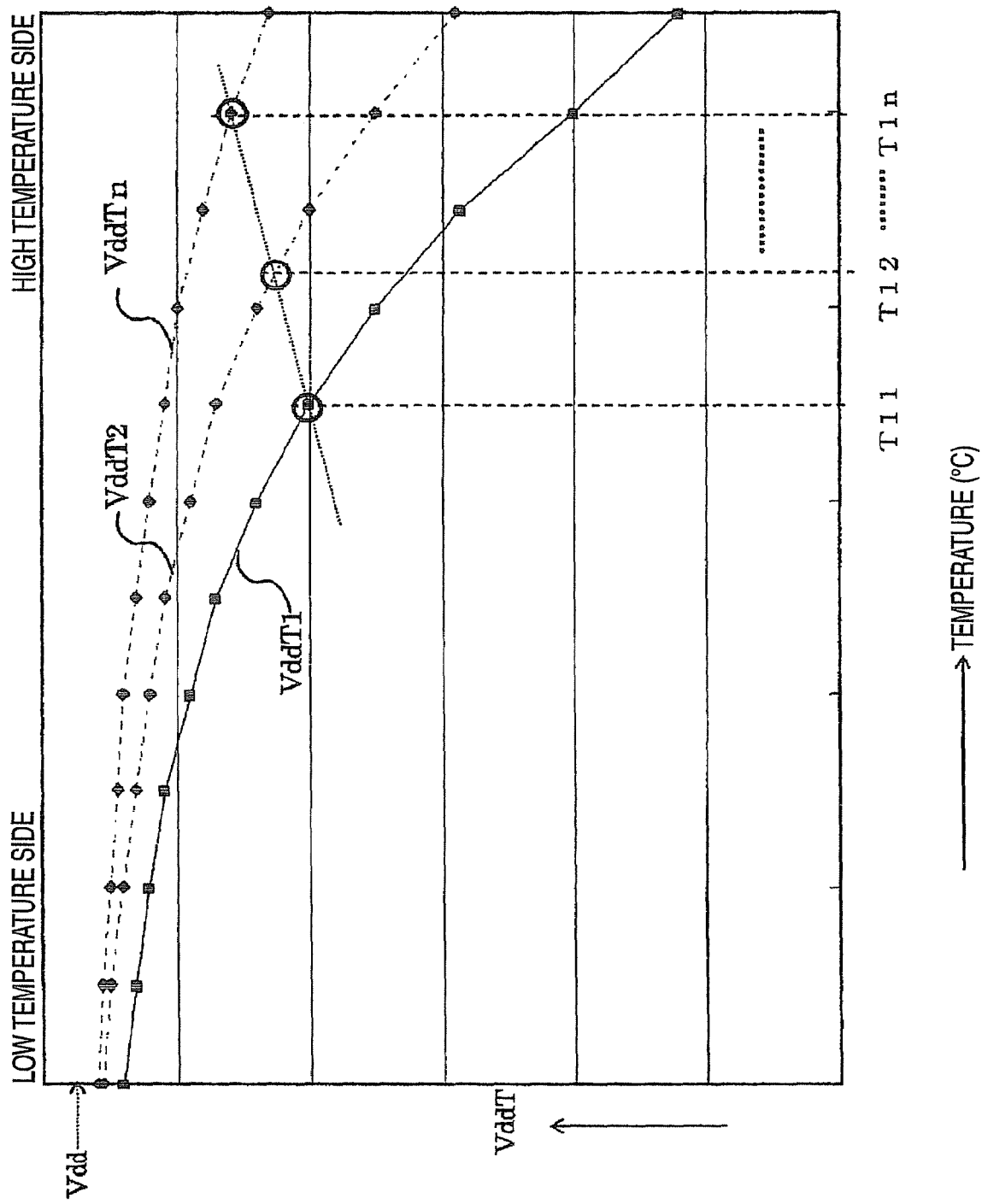
FIG. 11 is an exemplary graph illustrating a temperature detected by the temperature detection circuit according to preferred embodiment.

Next, a temperature detection circuit according to Embodiment 3 of the invention is described below with reference to the accompanying drawings. FIG. 9 is a circuit diagram illustrating a temperature detection circuit according to Embodiment 3 of the invention. FIG. 10 is a graph illustrating the temperature dependence of resistances constituting a voltage generating circuit portion according to Embodiment 3 of the invention. FIG. 11 is a graph illustrating a temperature detected by the temperature detection circuit according to Embodiment 3 of the invention. The voltage generating circuit portion according to the present embodiment generates a dropped high-potential-side power supply voltage, which has temperature dependence, using resistors.

Hereinafter, components of the present embodiment, which are the same as associated-components of Embodiment 1, are designated by the same reference numerals as reference numerals designating the associated-components used in Embodiment 1. Thus, the description of such components of Embodiment 3 is omitted. In the following description, only the differences between Embodiment 1 and Embodiment 3 are described.

As illustrated in FIG. 9, a temperature detection circuit 50a is provided with a voltage generating circuit portion 1b, a detection portion 2, and a control register 3a. A plurality of temperature detection circuits 50a are mounted on a semiconductor integrated circuit such as a system LSI or a system-on-a-chip (SoC) and detect the temperature of each part whose temperature rises due to a circuit operation. Electric characteristics, for example, a reference clock frequency used for a circuit operation and the impedance of an output driver are controlled in response to a change in temperature based on the temperature detected by the temperature detection circuits 50a.

The control register 3a generates control signals SG0 to SGn. An operation of the voltage generating circuit portion 1b is controlled, based on the (n+1) control signals SG0 to SGn output from the control register 3a.

The voltage generating circuit portion 1b is provided with an N-channel MOS transistor NT1, an N-channel MOS transistor NT1a, an N-channel MOS transistor NT1b, and N-channel MOS transistor NT1n, a resistor R1a, a resistor R1b, . . . , a resistor R1n, and resistors R21 to R2n. The voltage generating circuit portion 1b outputs a dropped high-potential-side power supply voltage VddT, which is obtained by resistance division using the resistors, to the detecting portion 2. The N-channel MOS transistor NT1a, the N-channel MOS transistor NT1b, and the N-channel MOS transistor NT1n, i.e., n of N-channel MOS transistors are parallel-arranged. The resistor R1a, the resistor R1b, . . . , the resistor R1n, and the resistors R21 to R2n, i.e., n of resistors are parallel-arranged.

Incidentally, P-type diffused resistors having a silicon substrate doped with P-type impurities. In a case where the concentration of the P-type impurities (e.g., boron) is low, the sheet resistance (ρs) of each of the P-type diffused resistors is high. In addition, the temperature coefficient of each of the P-type diffused resistors is positive (+) and large. In a case where the concentration of the P-type impurities is increased, the sheet resistance (ρs) of each of the P-type diffused resistors is decreased. In addition, the temperature coefficient of each of the P-type diffused resistors is positive (+) and is reduced.

As illustrated in FIG. 10, the resistor R1a, the resistor R1b, . . . , the resistor R1n, and the resistors R21 to R2n are such that the resistance value of each of the resistor R1a, the resistor R1b, . . . , and the resistor R1n is relatively large, and that the temperature coefficient of each of the resistor R1a, the resistor R1b, . . . , and the resistor R1n is positive (+) and is set to be small. At a low temperature side, the resistance value of each of the resistors R21 and R2n is substantially equal to each other. In addition, the resistance value of each of the resistors R21 and R2n is set to be less than the resistance value of each of the resistor R1b, . . . , and the resistor R1n. The temperature coefficient of the resistor R2n is positive (+) and is set to be larger than that of each of the resistor R1b, . . . , and the resistor R1n. The temperature coefficient of the resistor 22 is positive (+) and is set to be larger than that of the resistor R2n. The temperature coefficient of the resistor 21 is positive (+) and is set to be larger than that of the resistor R22.

The N-channel MOS transistor NT1a is such that the drain thereof is connected to a high-potential-side power supply voltage Vdd, and that a control signal SG1 is input to the gate thereof. The N-channel MOS transistor NT1a performs on-off operations based on the control signal SG1. The resistor R21 has one terminal connected to the source of the N-channel MOS transistor NT1a, and has also the other terminal connected to a node N11. The resistor R1a has one terminal connected to the node N11, and has also the other terminal connected to a node N4.

The N-channel MOS transistor NT1b is such that the drain thereof is connected to the high-potential-side power supply voltage Vdd, and that a control signal SG2 is input to the gate thereof. The N-channel MOS transistor NT1b performs on-off operations based on the control signal SG2. The resistor R22 has one terminal connected to the source of the N-channel MOS transistor NT1b, and has also the other terminal connected to a node N12. The resistor R1b has one terminal connected to the node N12, and has also the other terminal connected to the node N4.

The N-channel MOS transistor NT1n is such that the drain thereof is connected to the high-potential-side power supply voltage Vdd, and that a control signal SGn is input to the gate thereof. The N-channel MOS transistor NT1n performs on-off operations based on the control signal SGn. The resistor R2n has one terminal connected to the source of the N-channel MOS transistor NT1n, and has also the other terminal connected to a node N1n. The resistor R1n has one terminal connected to the node N1n, and has also the other terminal connected to the node N4.

The N-channel MOS transistors NT1a, the N-channel MOS transistors NT1b, . . . , the N-channel MOS transistors NT1n, and the N-channel MOS transistor NT1 are switches which operate based on the control signals SG0 to SGn. The resistance (i.e., the on-resistance) of each of the N-channel MOS transistors NT1b, . . . , the N-channel MOS transistors NT1n, and the N-channel MOS transistor NT1, which are in an on-state, is set at a value that is lower by, e.g., one order of magnitude or more than the resistance value of each of the resistor R1a, the resistor R1b, . . . , the resistor R1n, and the resistors R21 to R2n.

As illustrated in FIG. 11, in a case where the signal level of each of the control signals SG0 and SG1 is a "High"-level (i.e., a case where the high-potential-side power supply voltage VddT1 is output), the value of the high-potential-side power supply voltage VddT supplied from the voltage generating circuit portion 1b to the detecting portion 2 largely drops as an ambient temperature rises. In a case where the signal level of each of the control signals SG0 and SG2 is a "High"-level (i.e., a case where the high-potential-side power supply voltage VddT2 is output), the drop of the high-potential-side power supply voltage VddT2 with respect to the rise of an ambient temperature is less than that of the high-potential-side power supply voltage VddT1. In a case where the signal level of each of the control signals SG0 and Sn is a "High"-level (i.e., a case where a high-potential-side power supply voltage VddTn is output), the drop of the high-potential-side power supply voltage VddTn with respect to the rise of an ambient temperature is less than that of the high-potential-side power supply voltage VddT2. In the case of outputting the high-potential-side power supply voltage VddTn, the drop of the value of the voltage is smallest.

In a case where the control signals SG0 and SG1 are selected (or activated) in the temperature detection circuit 50a, the temperature T11 of the part, in which the temperature detection circuit 50a is provided, can be detected in the semiconductor integrated circuit. In a case where the control signals SG0 and SG2 are selected (or activated) in the temperature detection circuit 50a, the temperature T12 of the part, in which the temperature detection circuit 50a is provided, can be detected in the semiconductor integrated circuit (the temperature T12 is higher than the temperature T11). In a case where the control signals SG0 and SGn are selected (or activated) in the temperature detection circuit 50a, the temperature Tn of the part, in which the temperature detection circuit 50a is provided, can be detected in the semiconductor integrated circuit (the temperature Tn is higher than the temperature T(n−1)). That is, the temperature detection circuit 50a performs the n-condition monitoring of the part, in which the temperature detection circuit 50a is provided, in the semiconductor integrated circuit.

Incidentally, the relationship among the high-potential-side power supply voltage VddT1 (T11) at the temperature T11, the high-potential-side power supply voltage VddT2 (T12) at the temperature T12, and the high-potential-side power supply voltage VddT3 (T1n) at the temperature T1n is given by the following expression (16).

$$VddT1(T11) < VddT2(T12) < \ldots < VddTn(T1n) \quad (16)$$

As described above, the temperature detection circuit according to the present embodiment is provided with the voltage generating circuit portion 1b, the detecting portion 2, and the control register 3a. The voltage generating circuit portion 1b is provided with the N-channel MOS transistor NT1, the N-channel MOS transistor NT1a, the N-channel MOS transistor NT1b, the N-channel MOS transistor NT1n, the resistor R1a, the resistor R1b, . . . , the resistor R1n, and the resistors R21 to R2n. The voltage generating circuit portion 1b outputs the high-potential-side power supply voltage VddT, which is dropped by resistance division using the resistors.

Thus, a temperature can be measured using the temperature detection circuit 50a mounted on the semiconductor integrated circuit. Consequently, the mounting cost of the temperature detection circuit can considerably be reduced, as compared with conventional temperature detection circuits. Also, the mounting area of the temperature detection circuit can considerably be reduced, as compared with conventional temperature detection circuits. Additionally, a plurality of temperature detection circuits can appropriately be mounted on the semiconductor integrated circuit as temperature sensors, if necessary. Accordingly, the temperature of the entirety of a semiconductor integrated circuit chip can be monitored.

The invention is not limited to the aforementioned embodiments. Various modifications can be made without departing from the spirit of the present invention.

For example, in the embodiments, the voltage generating circuit portion outputs the high-potential-side power supply voltage VddT, which is dropped by the resistance division using the off-resistances of the transistors, the temperature coefficient of each of which is positive (+), the on-resistances of the transistors, the temperature coefficient of each of which is positive (+), or the resistors, the temperature coefficient of each of which is positive (+). However, each of the transistors and the resistors does not necessarily have a positive temperature coefficient (+). For example, the voltage generating circuit portion can output the high-potential-side power supply voltage VddT, which is dropped by the resistance division by cascade-connecting resistors, which has a temperature coefficient that is negative (−) and that has a relatively small value, and which has a relatively small resistance value, to resistors, which has a temperature coefficient that is negative (−) and that has a small value, and which has a relatively large resistance value. Although Embodiment 3 uses the P-type diffused resistors, N-type diffused resistors can be used. Alternatively, a P-type polysilicon film doped with P-type impurities on the field insulating film or an N-type polysilicon film doped with N-type impurities on the field insulating film can be used as a resistor.

Configurations described in the following additional description according to the invention can be considered.
(Additional Description 1)

A temperature detection circuit includes a voltage generating circuit portion which comprises a first N-channel insulated gate field effect transistor configured so that a drain thereof is connected to a high-potential-side power supply, and that a first control signal is input to a gate thereof, a first resistor configured so that one terminal thereof is connected to a source of the first N-channel insulated gate field effect transistor, and that a temperature coefficient thereof is positive, a second resistor configured so that one terminal thereof is connected to the other terminal of the first resistor, that a resistance value thereof is larger than a resistance value of the first resistor, and that a temperature coefficient thereof is smaller than a temperature coefficient of the first resistor, and a second N-channel insulated gate field effect transistor configured so that a drain thereof is connected to the other terminal of the second resistor, that a second control signal is input to a gate thereof, and that a source thereof is connected to the low-potential-side power supply, and which outputs from between the first resistor and the second resistor a dropped high-potential-side power supply voltage obtained by dropping the high-potential-side power supply voltage, and includes also a detecting portion which comprises delay means provided between the dropped high-potential-side power supply and the low-potential-side power supply and configured to receive a pulse signal, and to output a delayed pulse signal obtained by delaying the pulse signal, and temperature detecting means configured to receive the pulse signal and the delayed pulse signal, to latch the delayed pulse signal based on the pulse signal, and to detect an ambient temperature when a signal level of the delayed pulse signal changes.

(Additional Description 2)

A temperature detection circuit includes a voltage generating circuit portion which comprises a first N-channel insulated gate field effect transistor configured so that a drain thereof is connected to a high-potential-side power supply, and that a first control signal is input to a gate thereof, a first resistor configured so that one terminal thereof is connected to a source of the first N-channel insulated gate field effect transistor, and that a temperature coefficient thereof is negative, a second resistor configured so that one end thereof is connected to the other terminal of the first resistor, that a resistance value thereof is larger than a resistance value of the first resistor, and that a temperature coefficient thereof is smaller than a temperature coefficient of the first resistor, and a second N-channel insulated gate field effect transistor configured so that a drain thereof is connected to the other terminal of the second resistor, that a second control signal is input to a gate thereof, and that a source thereof is connected to the low-potential-side power supply, and which outputs from between the first resistor and the second resistor a dropped high-potential-side power supply voltage obtained by dropping the high-potential-side power supply voltage, and includes also a detecting portion which comprises delay means provided between the dropped high-potential-side power supply and the low-potential-side power supply and configured to receive a pulse signal, and to output a delayed pulse signal obtained by delaying the pulse signal, and temperature detecting means configured to receive the pulse signal and the delayed pulse signal, to latch the delayed pulse signal based on the pulse signal, and to detect an ambient temperature when a signal level of the delayed pulse signal changes.

(Additional Description 3)

A temperature detection circuit includes a voltage generating circuit portion which comprises a first N-channel insulated gate field effect transistor configured so that a drain thereof is connected to a high-potential-side power supply, and that a first control signal is input to a gate thereof, a first D-type N-channel insulated gate field effect transistor configured so that a drain thereof is connected to a source of the first N-channel insulated gate field effect transistor, and that a gate thereof is connected to a low-potential-side power supply, and that a temperature coefficient of an off-resistance thereof is positive, a second D-type N-channel insulated gate field effect transistor configured so that a drain thereof is connected to a source of the first D-type N-channel insulated gate field effect transistor, that a gate thereof is connected to the low-potential-side power supply, that a resistance value of an off-resistance thereof is larger than a resistance value of the first D-type N-channel insulated gate field effect transistor, and that a temperature coefficient of the off-resistance thereof is smaller than a temperature coefficient of the off-resistance of the first D-type N-channel insulated gate field effect transistor, and a second N-channel insulated gate field effect transistor configured so that a drain thereof is connected to a source of the D-type N-channel insulated gate field effect transistor, that a second control signal is input to a gate thereof, and that a source thereof is connected to the low-potential-side power supply, and which outputs from between the source of the first D-type N-channel insulated gate field effect transistor and the drain of the second D-type N-channel insulated gate field effect transistor a dropped high-potential-side power supply voltage obtained by dropping the high-potential-side power supply voltage, and includes also a detecting portion which comprises delay means provided between the dropped high-potential-side power supply and the low-potential-side power supply and configured to receive a pulse signal, and to output a delayed pulse signal obtained by delaying the pulse signal, and temperature detecting means configured to receive the pulse signal and the delayed pulse signal, to latch the delayed pulse signal based on the pulse signal, and to detect an ambient temperature when a signal level of the delayed pulse signal changes.

(Additional Description 4)

A temperature detection circuit includes a voltage generating circuit portion which comprises a first N-channel insulated gate field effect transistor configured so that a drain thereof is connected to a high-potential-side power supply, and that a first control signal is input to a gate thereof, a first P-channel insulated gate field effect transistor configured so that a source thereof is connected to a source of the first N-channel insulated gate field effect transistor, that a gate thereof is connected to a low-potential-side power supply, and that a temperature coefficient of an on-resistance thereof is positive, a second P-channel insulated gate field effect transistor configured so that a source thereof is connected to a drain of the first P-channel insulated gate field effect transistor, that a gate thereof is connected to the low-potential-side power supply, that a resistance value of an on-resistance thereof is larger than a resistance value of an on-resistance of the first P-channel insulated gate field effect transistor, that a temperature coefficient of the on-resistance thereof is positive, and that the temperature coefficient of the on-resistance thereof is smaller than a temperature coefficient of the on-resistance of the first P-channel insulated gate field effect transistor, and a second N-channel insulated gate field effect transistor configured so that a drain thereof is connected to a drain of the second P-channel insulated gate field effect transistor, that a second control signal is input to a gate thereof, and that a source thereof is connected to the low-potential-side power supply, and which outputs from between the drain of the first P-channel insulated gate field effect transistor and the source of the second P-channel insulated gate field effect transistor a dropped high-potential-side power supply voltage obtained by dropping the high-potential-side power supply voltage, and includes also a detecting portion which comprises delay means provided between the dropped high-potential-side power supply and the low-potential-side power supply and configured to receive a pulse signal, and to output a delayed pulse signal obtained by delaying the pulse signal, and temperature detecting means configured to receive the pulse signal and the delayed pulse signal, to latch the delayed pulse signal based on the pulse signal, and to detect an ambient temperature when a signal level of the delayed pulse signal changes.

(Additional Description 5)

The temperature detection circuit described in one of Additional Descriptions 1 to 4 is adapted so that the delay means is an inverter chain having a plurality of stages provided between the dropped high-potential-side power supply and the low-potential-side power supply, and that the temperature detecting means is a flip-flop which inputs the delayed pulse signal to a data port and which latches the delayed pulse based on an inversion signal of the pulse signal.

As described with reference to the embodiment, there is provided a temperature detection circuit that is mounted on a semiconductor integrated circuit and that has a small circuit size.

What is claimed is:

1. A temperature detection circuit comprising:
   a voltage generator that is configured to be connected to a first voltage line having first voltage and a second voltage line having second voltage that is lower than the first voltage and to output a third voltage to a third voltage line, the third voltage being obtained by transforming the first voltage to be stepped down as an ambient temperature becomes higher; and
   a detecting unit that includes:
      a delay section that is configured to be connected to the second voltage line and the third voltage line and to receive a pulse signal, the delay section being configured to output a delayed pulse signal that is obtained by delaying the pulse signal for a delay time set to be longer as the third voltage becomes lower; and
      a temperature detecting section that is configured to:
         receive the delayed pulse signal and the pulse signal;
         latch the delayed pulse signal based on the pulse signal;
         output the latched signal as a detection result indicating change of the ambient temperature.

2. The temperature detection circuit according to claim 1, wherein the delay section includes a plurality of inverters connected to each other in serial form, and
   wherein the temperature detecting section includes an inverter generating inverted pulse signal from the pulse signal and flip-flop latching the delayed pulse signal based on the inverted pulse signal.

3. The temperature detection circuit according to claim 1, wherein the voltage generator includes:
   a first D-type P-channel field effect transistor (FET) having a first source electrode connect to the first voltage line, a first drain electrode connected to the third voltage line to supply the third voltage to the third voltage line, and first gate electrode connected to the first voltage line;
   a second D-type P-channel FET having a second source electrode connected to the first drain electrode, a second gate electrode connected to the first voltage line, and a second drain electrode connected to the second voltage line.

4. The temperature detection circuit according to claim 3, wherein a temperature coefficient of an off-resistance of the first D-type P-channel FET is positive,
   wherein a temperature coefficient of an off-resistance of the second D-type P-channel FET is positive and smaller than the temperature coefficient of the off-resistance of the first P-channel FET,
   wherein the off-resistance of the second D-type P-channel FET is larger than the off-resistance of the first D-type P-channel FET.

5. The temperature detection circuit according to claim 3, wherein a temperature coefficient of an off-resistance of the first D-type P-channel FET is negative,
   wherein a temperature coefficient of an off-resistance of the second D-type P-channel FET is negative and larger than the temperature coefficient of the off-resistance of the first D-type P-channel FET,
   wherein the off-resistance of the second D-type P-channel FET is larger than the off-resistance of the first D-type P-channel FET.

6. The temperature detection circuit according to claim 3, wherein the voltage generator further includes:
   a first gate FET interposed between the first voltage line and the first source electrode to control a connection between the first voltage line and the first source electrode, and
   a second gate FET between the second voltage line and the second drain electrode to control a connection between the second voltage line and the second D-type P-channel FET.

7. The temperature detection circuit according to claim 3, wherein the first D-type P-channel FET and the second P-channel FET are D-type P-channel Metal Oxide Semiconductor Field Effect Transistors (MOSFET).

8. The temperature detection circuit according to claim 3, wherein the first D-type P-channel FET and the second D-type P-channel FET are Metal Insulator Semiconductor Field Effect Transistors (MISFET).

9. The temperature detection circuit according to claim 1, wherein the voltage generator includes:
   a first D-type N-channel field effect transistor (FET) having a first drain electrode connect to the first voltage line, a first source electrode connected to the third voltage line to supply the third voltage to the third voltage line, and first gate electrode connected to the first voltage line;
   a second D-type N-channel FET having a second drain electrode connected to the first source electrode, a second source electrode connected to the second voltage line, and a second gate electrode connected to the first voltage line.

10. The temperature detection circuit according to claim 9, wherein a temperature coefficient of an on-resistance of the first D-type N-channel FET is positive,
    wherein a temperature coefficient of an on-resistance of the second D-type N-channel FET is positive and smaller than the temperature coefficient of the on-resistance of the first D-type N-channel FET,
    wherein the on-resistance of the second D-type N-channel FET is larger than the on-resistance of the first D-type N-channel FET.

11. The temperature detection circuit according to claim 9, wherein a temperature coefficient of an on-resistance of the first D-type N-channel FET is negative,
    wherein a temperature coefficient of an on-resistance of the second D-type N-channel FET is negative and larger than the temperature coefficient of the on-resistance of the first D-type N-channel FET,
    wherein the on-resistance of the second D-type N-channel FET is larger than the on-resistance of the first D-type N-channel FET.

12. The temperature detection circuit according to claim 9, wherein the voltage generator further includes:
    a first gate FET interposed between the first voltage line and the first drain electrode to control a connection between the first voltage line and the first drain electrode, and a second gate FET interposed between the second voltage line and the second source electrode to control a connection between the second voltage line and the second source electrode.

13. The temperature detection circuit according to claim 9, wherein the first N-channel FET and the second N-channel FET are D-type N-channel Metal Oxide Semiconductor Field Effect Transistors (MOSFET).

14. The temperature detection circuit according to claim 9, wherein the first N-channel FET and the second N-channel FET are Metal Insulator Semiconductor Field Effect Transistors (MISFET).

15. The temperature detection circuit according to claim 1, wherein the voltage generator includes:
 a first resistor having a first electrode connect to the first voltage line and a second electrode connected to the third voltage line to supply the third voltage to the third voltage line;
 a second resistor having a third electrode connected to the second electrode and a fourth electrode connected to the second voltage line.

16. The temperature detection circuit according to claim 15, wherein a temperature coefficient of a resistance of the first resistor is positive,
 wherein a temperature coefficient of a resistance of the second resistor is positive and smaller than the temperature coefficient of the resistance of the first resistor,
 wherein the resistance of the second resistor is larger than the resistance of the first resistor.

17. The temperature detection circuit according to claim 15, wherein a temperature coefficient of the first resistor is negative,
 wherein a temperature coefficient of the second resistor is negative and larger than the temperature coefficient of the resistance of the first resistor,
 wherein the resistance of the second resistor is larger than the resistance of the first resistor.

18. The temperature detection circuit according to claim 15, wherein the voltage generator further includes:
 a first switching device between the first voltage line and the first electrode to control a connection between the first voltage line and the first electrode, and
 a second switching device between the second voltage line and the fourth electrode to control a connection between the second voltage line and the fourth electrode.

19. The temperature detection circuit according to claim 1, wherein the delay section includes a plurality of buffers connected to each other in serial form, and
 wherein the temperature detecting section includes an inverter generating inverted pulse signal from the pulse signal and flip-flop latching the delayed pulse signal based on the inverted pulse signal.

* * * * *